United States Patent
Kraus et al.

(10) Patent No.: US 12,195,157 B1
(45) Date of Patent: Jan. 14, 2025

(54) STOWABLE PROPULSION DEVICES FOR MARINE VESSEL

(71) Applicant: Brunswick Corporation, Mettawa, IL (US)

(72) Inventors: Jeremy J. Kraus, Mt. Calvary, WI (US); Aaron J. Novak, North Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 432 days.

(21) Appl. No.: 17/553,245

(22) Filed: Dec. 16, 2021

Related U.S. Application Data

(63) Continuation-in-part of application No. 17/185,289, filed on Feb. 25, 2021, now Pat. No. 11,572,146.

(51) Int. Cl.
*B63H 21/30* (2006.01)
*F16M 1/04* (2006.01)

(52) U.S. Cl.
CPC ............... *B63H 21/30* (2013.01); *F16M 1/04* (2013.01); *F16M 2200/024* (2013.01); *F16M 2200/068* (2013.01)

(58) Field of Classification Search
CPC .... B63H 21/30; F16M 1/04; F16M 2200/024; F16M 2200/068
See application file for complete search history.

(56) References Cited

U.S. PATENT DOCUMENTS

| | | | |
|---|---|---|---|
| 2,213,520 | A | 9/1940 | Gentry |
| 3,236,202 | A | 2/1966 | Quady et al. |
| 3,462,102 | A | 8/1969 | Rivers |
| 3,809,343 | A | 5/1974 | Adams et al. |
| 3,865,335 | A | 2/1975 | Roller et al. |
| 3,874,318 | A | 4/1975 | Langley |
| 3,995,579 | A | 12/1976 | Childre |
| 3,999,500 | A | 12/1976 | Friedel et al. |

(Continued)

FOREIGN PATENT DOCUMENTS

| | | |
|---|---|---|
| EP | 1611007 | 8/2007 |
| EP | 1914161 | 4/2008 |

(Continued)

OTHER PUBLICATIONS

International Search Report and Written Opinion for International Application No. PCT/CA/2016/050308 mailed Jun. 9, 2016.

(Continued)

*Primary Examiner* — Andrew Polay
(74) *Attorney, Agent, or Firm* — Andrus Intellectual Property Law, LLP

(57) ABSTRACT

A stowable propulsion device for a marine vessel. A base is configured to be coupled to the marine vessel. A propulsor is configured to propel the marine vessel in water. An arm pivotably couples the propulsor to the base such that the propulsor is movable into and between a stowed position and a deployed position, where the propulsor is closer to the base in the stowed position than in the deployed position. A first actuator pivots the arm so as to move the propulsor into and between the stowed position and the deployed position. A second actuator is manually actuatable to pivot the arm so as to move the propulsor towards the stowed position.

19 Claims, 14 Drawing Sheets

(56) References Cited

U.S. PATENT DOCUMENTS

| | | |
|---|---|---|
| 4,008,680 A | 2/1977 | Alexander, Jr. |
| 4,294,186 A | 10/1981 | Wardell |
| 4,410,161 A | 10/1983 | Booty |
| 4,548,586 A | 10/1985 | Philips |
| 4,734,068 A | 3/1988 | Edwards |
| 4,875,656 A | 10/1989 | Boede |
| 4,911,398 A | 3/1990 | Diiulio et al. |
| 4,966,566 A | 10/1990 | Baird |
| 5,005,798 A | 4/1991 | Mccoy |
| 5,022,609 A | 6/1991 | Cranston |
| 5,131,875 A | 7/1992 | Lee |
| 5,152,240 A | 10/1992 | Fontanille |
| 5,195,914 A | 3/1993 | Binversie et al. |
| 5,277,630 A | 1/1994 | Clark |
| 5,499,792 A | 3/1996 | Tamiso |
| 5,595,133 A | 1/1997 | Bullard |
| 5,639,272 A | 6/1997 | Henderon et al. |
| 5,669,794 A | 9/1997 | Knight et al. |
| 5,941,742 A | 8/1999 | Whitaker |
| 6,142,841 A | 11/2000 | Alexander, Jr. et al. |
| 6,257,165 B1 | 7/2001 | Danos et al. |
| 6,280,267 B1 | 8/2001 | Griffith, Sr. et al. |
| 6,325,685 B1 | 12/2001 | Knight et al. |
| 6,431,923 B1 | 8/2002 | Knight et al. |
| 6,592,412 B1 | 7/2003 | Geil et al. |
| 6,789,648 B2 | 9/2004 | Cook |
| 7,004,803 B2 | 2/2006 | Ruffe |
| 7,004,804 B2 | 2/2006 | Bernloehr et al. |
| RE39,032 E | 3/2006 | Gonring et al. |
| 7,150,662 B1 | 12/2006 | Janitz |
| 7,182,033 B1 | 2/2007 | Philips et al. |
| 7,185,599 B1 | 3/2007 | Griffiths et al. |
| 7,285,029 B1 | 10/2007 | Janitz |
| 7,294,029 B1 | 11/2007 | Spaulding |
| 7,305,928 B2 | 12/2007 | Bradley et al. |
| 7,399,211 B1 | 7/2008 | Spaulding |
| 7,510,450 B1 | 3/2009 | Dresher |
| 7,520,239 B2 | 4/2009 | Bryham |
| 7,533,622 B1 | 5/2009 | Jaszewski et al. |
| 7,753,745 B2 | 7/2010 | Schey et al. |
| 7,806,065 B1 | 10/2010 | Bekker et al. |
| 7,887,381 B2 | 2/2011 | Brass et al. |
| 7,946,243 B1 | 5/2011 | Ulrich |
| 8,011,982 B1 | 9/2011 | Baier et al. |
| 8,051,793 B2 | 11/2011 | Ulgen |
| 8,123,577 B2 | 2/2012 | Riggs |
| 8,479,677 B2 | 7/2013 | Bolline et al. |
| 8,814,616 B2 | 8/2014 | Riggs |
| 9,108,710 B1 | 8/2015 | Mcchesney et al. |
| 9,296,455 B2 * | 3/2016 | Bernloehr .............. B63H 21/17 |
| 9,586,655 B1 | 3/2017 | Butler |
| 9,738,364 B2 | 8/2017 | Abney |
| 9,889,914 B1 * | 2/2018 | Ostrowsky ............. B63H 20/16 |
| 9,896,162 B2 | 2/2018 | Mcclure |
| 9,969,474 B1 | 5/2018 | Traux et al. |
| 10,167,069 B2 | 1/2019 | Houle et al. |
| 10,220,926 B1 | 3/2019 | Pelini |
| 10,407,131 B1 | 9/2019 | Ward |
| 10,850,820 B1 | 12/2020 | Minogue |
| 11,591,057 B2 | 2/2023 | Tornbaum et al. |
| 11,603,179 B2 | 3/2023 | Poirier et al. |
| 11,643,176 B1 | 5/2023 | Mueller et al. |
| 2002/0142680 A1 | 10/2002 | Anderson |
| 2005/0159053 A1 | 7/2005 | Ruffe |
| 2006/0228959 A1 | 10/2006 | Ruiz |
| 2007/0232159 A1 | 10/2007 | Lee |
| 2008/0190227 A1 | 8/2008 | Myers et al. |
| 2009/0227158 A1 | 9/2009 | Bernloehr et al. |
| 2010/0032545 A1 | 2/2010 | Bernloehr et al. |
| 2010/0116967 A1 | 5/2010 | Todd et al. |
| 2010/0136857 A1 | 6/2010 | Goudsmit |
| 2012/0097086 A1 | 4/2012 | Sancoff |
| 2014/0158037 A1 | 6/2014 | George |
| 2015/0201548 A1 | 7/2015 | Wolter et al. |
| 2015/0259033 A1 | 9/2015 | George et al. |
| 2016/0001865 A1 | 1/2016 | Bernloehr et al. |
| 2017/0203823 A1 | 8/2017 | Abney |
| 2017/0341718 A1 | 11/2017 | Zimmerman |
| 2018/0057130 A1 | 3/2018 | Houle et al. |
| 2018/0334233 A1 | 11/2018 | Vance, Jr. |
| 2019/0217921 A1 | 7/2019 | Shibayama et al. |
| 2021/0354803 A1 | 11/2021 | Christensen et al. |
| 2021/0380210 A1 | 12/2021 | Fishburn et al. |
| 2022/0266968 A1 | 8/2022 | Tornbaum et al. |

FOREIGN PATENT DOCUMENTS

| | | |
|---|---|---|
| EP | 1914161 A2 | 4/2008 |
| EP | 2757037 | 7/2014 |
| EP | 2757037 A1 | 7/2014 |
| EP | 2242678 | 11/2015 |
| EP | 2246252 | 5/2019 |
| GB | 2554045 | 3/2018 |
| JP | 2013100013 | 5/2013 |
| JP | 201300013 A | 5/2015 |

OTHER PUBLICATIONS

Tornbaum, Andres Perdomo, "Methods for a Marine Vessel with Primary and Auxiliary Propulsion Devices," Unpublished U.S. Appl. No. 16/984,617, filed Aug. 4, 2020 (specification and drawings only).

Owerboat Television, "How to make docking a pontoon boat easy with a retractable SideShift Thruster | My Boat DIY", YouTube video, Jun. 1, 2020, available at https://www.youtube.com/watch?v=2NBx-Vnl3Kk.

Sideshift Inc., "Sideshift Dock Like a Pro PT230/PT360 Pontoon Thruster System," Installation/Operation Manual, Oct. 2019, vol. 2.4.

Unpublished U.S. Appl. No. 17/185,289, filed Feb. 25, 2021 by Jeremy J. Kraus.

Unpublished U.S. Appl. No. 17/378,371, filed Jul. 16, 2021 by Andres Perdomo Tombaum.

* cited by examiner

FIG. 11 (SECTION A-A)

(SECTION B-B)

STOWABLE PROPULSION DEVICES FOR MARINE VESSEL

CROSS REFERENCE TO RELATED APPLICATION

This application is a continuation-in-part of U.S. patent application Ser. No. 17/185,289, filed Feb. 25, 2021, which is incorporated herein by reference in its entirety.

FIELD

The present disclosure generally relates to stowable propulsion devices for marine vessels.

BACKGROUND

The following U.S. Patents provide background information and are incorporated by reference in entirety.

U.S. Pat. No. 6,142,841 discloses a maneuvering control system that utilizes pressurized liquid at three or more positions of a marine vessel to selectively create thrust that moves the marine vessel into desired locations and according to chosen movements. A source of pressurized liquid, such as a pump or a jet pump propulsion system, is connected to a plurality of distribution conduits which, in turn, are connected to a plurality of outlet conduits. The outlet conduits are mounted to the hull of the vessel and direct streams of liquid away from the vessel for purposes of creating thrusts which move the vessel as desired. A liquid distribution controller is provided which enables a vessel operator to use a joystick to selectively compress and dilate the distribution conduits to orchestrate the streams of water in a manner which will maneuver the marine vessel as desired.

U.S. Pat. No. 7,150,662 discloses a docking system for a watercraft and a propulsion assembly therefor. The docking system comprises a plurality of the propulsion assemblies. Each propulsion assembly includes a motor and propeller assembly provided on the distal end of a steering column. Each of the propulsion assemblies is attachable in an operating position such that the motor and propeller assembly thereof will extend into the water and can be turned for steering the watercraft.

U.S. Pat. No. 7,305,928 discloses a vessel positioning system which maneuvers a marine vessel in such a way that the vessel maintains its global position and heading in accordance with a desired position and heading selected by the operator of the marine vessel. When used in conjunction with a joystick, the operator of the marine vessel can place the system in a station keeping enabled mode and the system then maintains the desired position obtained upon the initial change in the joystick from an active mode to an inactive mode. In this way, the operator can selectively maneuver the marine vessel manually and, when the joystick is released, the vessel will maintain the position in which it was at the instant the operator stopped maneuvering it with the joystick.

U.S. Pat. No. 7,753,745 discloses status indicators for use with a watercraft propulsion system. An example indicator includes a light operatively coupled to a propulsion system of a watercraft, wherein an operation of the light indicates a status of a thruster system of the propulsion system.

U.S. Pat. No. RE39032 discloses a multipurpose control mechanism which allows the operator of a marine vessel to use the mechanism as both a standard throttle and gear selection device and, alternatively, as a multi-axes joystick command device. The control mechanism comprises a base portion and a lever that is movable relative to the base portion along with a distal member that is attached to the lever for rotation about a central axis of the lever. A primary control signal is provided by the multipurpose control mechanism when the marine vessel is operated in a first mode in which the control signal provides information relating to engine speed and gear selection. The mechanism can also operate in a second or docking mode and provide first, second, and third secondary control signals relating to desired maneuvers of the marine vessel.

U.S. patent application Ser. Nos. 17/185,289 and 17/378,371, European Patent Application No. EP 1,914,161, European Patent Application No. EP2,757,037, and Japanese Patent Application No. JP2013100013A also provide background information and are incorporated by reference in entirety.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment according to the present disclosure generally relates to a stowable propulsion device for a marine vessel. A base is configured to be coupled to the marine vessel. A propulsor is configured to propel the marine vessel in water. An arm pivotably couples the propulsor to the base such that the propulsor is movable into and between a stowed position and a deployed position, where the propulsor is closer to the base in the stowed position than in the deployed position. A first actuator pivots the arm so as to move the propulsor into and between the stowed position and the deployed position. A second actuator is manually actuatable to pivot the arm so as to move the propulsor towards the stowed position.

Another embodiment according to the present disclosure generally relates to a stowable propulsion device for a marine vessel. A base is configured to be coupled to the marine vessel. A rail is coupled to the base and a carriage moves along the rail in a first direction and in a second direction opposite the first direction. A propulsor is configured to propel the marine vessel in water. An arm pivotably couples the propulsor to the base such that the propulsor is movable into and between a stowed position and a deployed position, where the propulsor is closer to the base in the stowed position than in the deployed position. A first actuator coupled at a first end to the carriage and coupled at a second end to the arm, where actuating the first actuator creates forces on the carriage in the first direction along the rail and causes the arm to rotate. A stop member positioned to limit the movement of the carriage in the first direction, where limiting the movement of the carriage limits movement of the first end of the first actuator such that actuation of the first actuator causes the second end to move to pivot the arm.

Another embodiment according to the present disclosure generally relates to a stowable propulsion device for a marine vessel. A base is configured to be coupled to the marine vessel. A rail is coupled to the base and a carriage that moves along the rail in a first direction and in a second direction opposite the first direction. A propulsor is configured to propel the marine vessel in water. An arm pivotably couples the propulsor to the base such that the propulsor is movable into and between a stowed position and a deployed position, where the propulsor is closer to the base in the stowed position than in the deployed position. A first actuator is coupled at a first end to the carriage and coupled at a second end to the arm. A first actuator coupled at a first end to the carriage and coupled at a second end to the arm, where actuating the first actuator creates forces on the carriage in the first direction along the rail and causes the arm to pivot so as to move the propulsor into and between the stowed position and the deployed position. A second actuator coupled to the arm and manually actuatable to pivot the arm so as to move the propulsor towards the stowed position. A stop member positioned to limit the movement of the carriage in the first direction, where limiting the movement of the carriage limits movement of the first end of the first actuator such that actuation of the first actuator causes the second end to move to pivot the arm. A detent configured to provide a resistance force, where the detent prevents the movement of the carriage in the second direction past the detent unless a movement force acting on the carriage in the second direction exceeds the resistance force of the detent, and where manually actuating the second actuator provides the movement force on the carriage to move past the detent in the second direction so as to pivot the arm and move the propulsor towards the stowed position.

Various other features, objects and advantages of the disclosure will be made apparent from the following description taken together with the drawings.

BRIEF DESCRIPTION OF THE DRAWINGS

The present disclosure is described with reference to the following drawings.

DETAILED DISCLOSURE

The present disclosure relates to propulsion devices stowable by first and second actuators. Through experimentation and development, the present inventors have recognized a problem for stowable propulsion devices for marine vessels (e.g., bow thrusters designed to be retractable for storage). Specifically, devices presently known in the art typically use one mechanism for moving the propulsor between stowed and deployed positions, such as an electro-mechanical, pneumatic, and/or hydraulic linear actuator. However, if this mechanism is damaged or fails when the propulsor is not fully stowed, there is no safe, easy, or convenient way of manually stow the propulsor. Moreover, an inoperable actuator acts as a lock, preventing manual movement of the propulsor into the stowed position. One alternative design disclosed in U.S. patent application Ser. No. 17/378,371 allows for manual stowing of a stowable propulsion device, but requires the operator to enter the water, remove a pin, lift the heavy propulsor and other connected components to the stowed position, and reinsert another pin to hold the device in the stowed position. In certain contents, this can be very challenging and/or dangerous, including in deeper water, higher wave swells, or in high currents.

Figure 1:
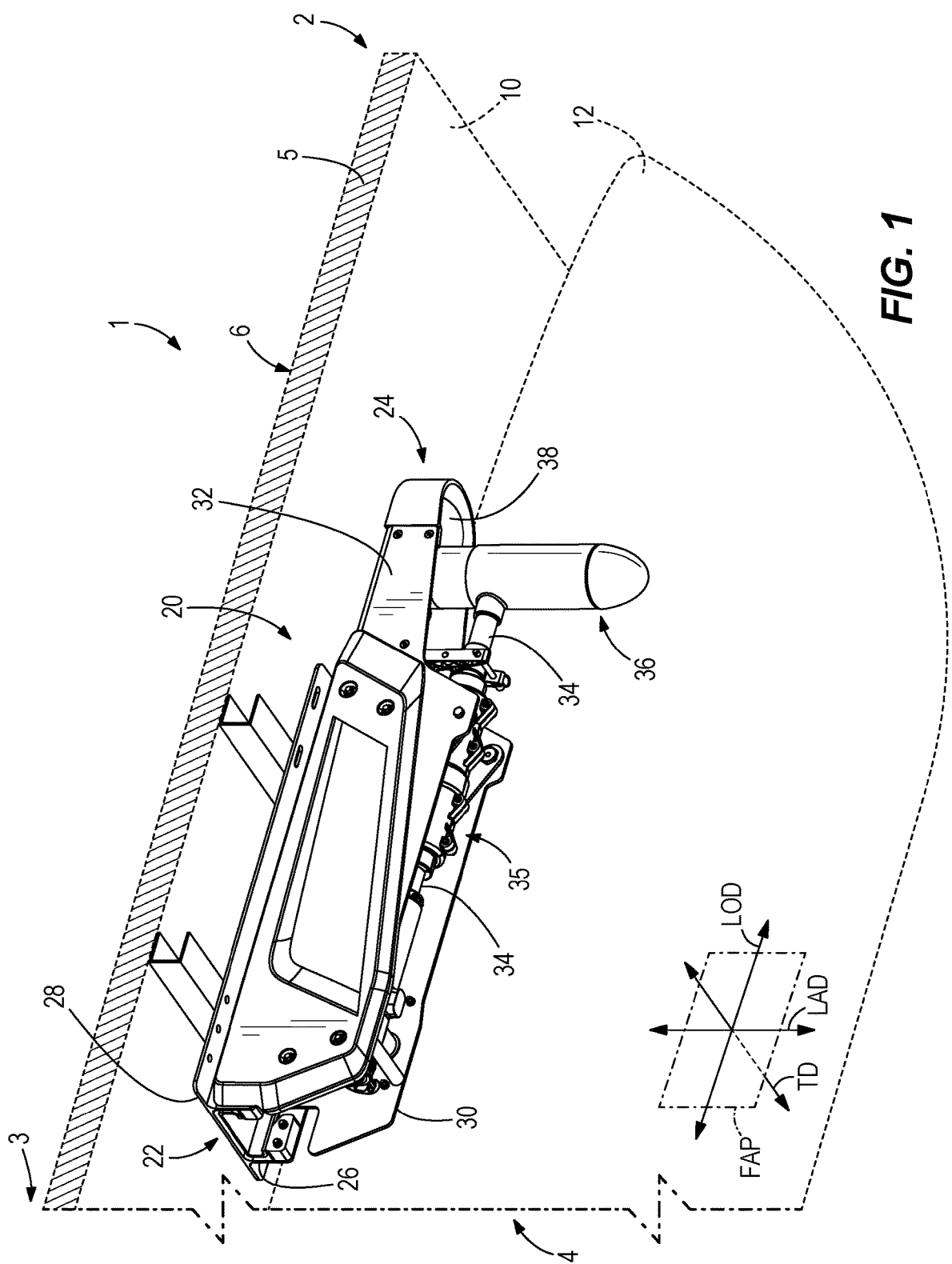
FIG. 1 is a right perspective view of a stowable propulsion device with first and second actuators according to the present disclosure coupled to a marine vessel.

FIG. 1 depicts the underside of a marine vessel 1 that extends between a bow 2 and a stern 3 defining a longitudinal direction LOD therebetween, as well as between port 4 and starboard 5 sides defining a transverse direction TD therebetween. The transverse direction TD is perpendicular to the longitudinal direction LOD. A latitudinal direction LAD extends perpendicularly to both the longitudinal direction LOD and the transverse direction TD. The longitudinal direction LOD and latitudinal direction LAD form a fore-aft plan FAP that bisects the marine vessel 1 between the port 4 and starboard 5 sides from the bow 2 to the stern 3. The latitudinal direction LAD and the longitudinal direction LOD are also referred to as corresponding to vertical and horizontal dimensions, respectively.

The marine vessel 1 includes a deck 6 with pontoons 12 mounted to an underside 10 of the deck 6 in a customary manner. A stowable propulsion device according to the present disclosure, also referred to as a device 20, is coupled to the underside 10 of the deck 6, here between the pontoons 12. The device 20 includes a base 22 that extends between a front 24 and a back 26, a top 28 and a bottom 30, and sides 32. Openings 130 (FIG. 2) are defined within the sides 32, in certain examples entirely therethrough, which are discussed further below. FIG. 1 further shows the top 28 of the base 22 being coupled to the marine vessel 1 (e.g., via fasteners such as bolts or screws). The device 20 includes a propulsor 36 configured to propel the marine vessel 1 in water when in a deployed position (e.g., FIG. 6), such as via an electric motor rotating a propeller 38 in a customary manner. Additional information regarding the base 22 and propulsor 36 is provided in U.S. patent application Ser. No. 17/185,289.

As will be discussed further below, the propulsor 36 is movable into and between a stowed position and a deployed position. The propulsor 36 is movable by a first actuator under normal conditions, and also movable by a second actuator as needed. For clarity, FIGS. 2-7 show only the first actuator, with the second actuator omitted.

Figure 2:
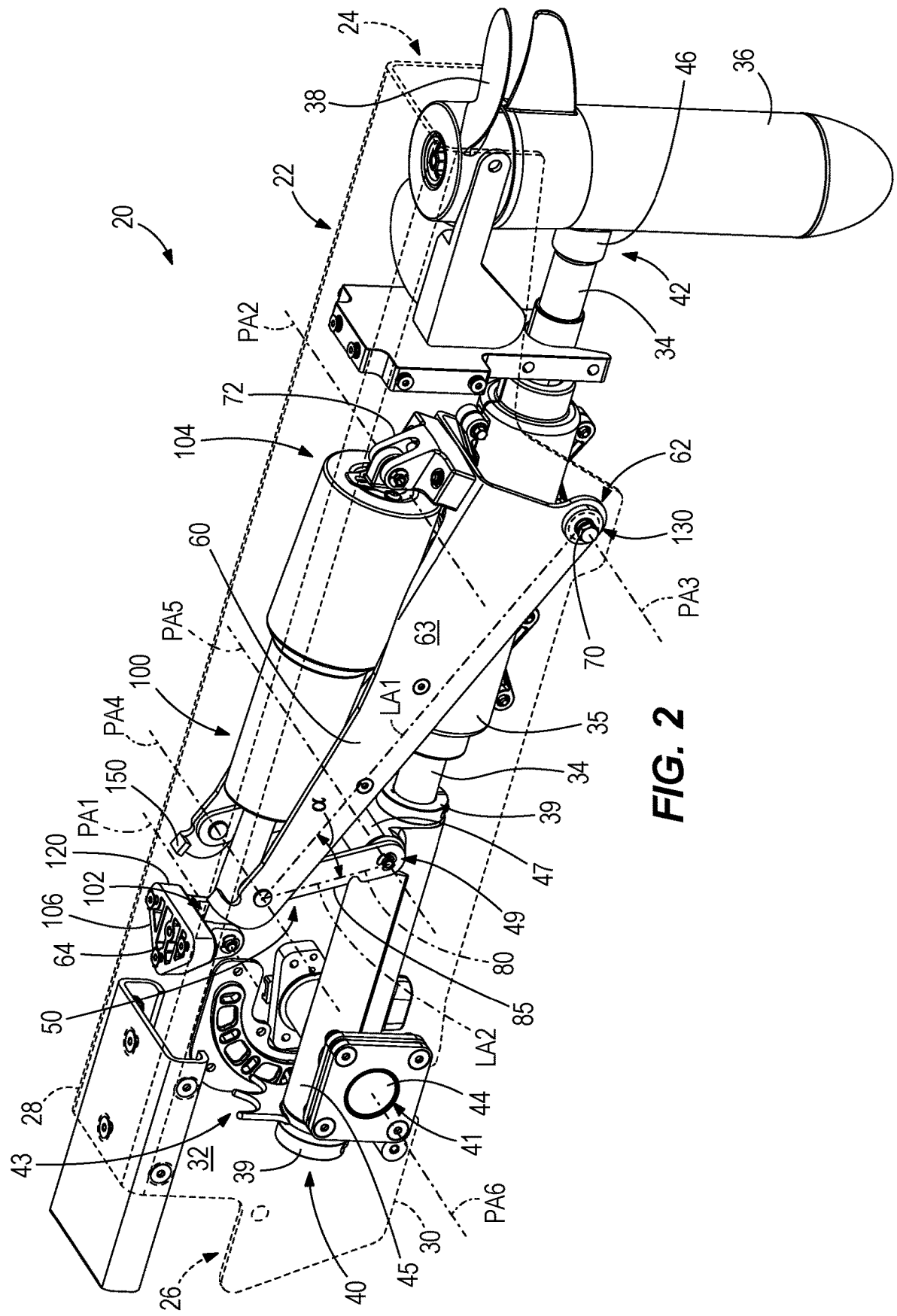
FIG. 2 is a right perspective view showing the inside of the device of FIG. 1 shown separate from the marine vessel and with the second actuator removed for clarity.

FIG. 2 shows the device 20 of FIG. 1 with the base 22 in dashed lines to reveal the interior. The device 20 has an arm 34 that extends between a first end 40 and an opposite second end 42 defining a length therebetween. The arm 34 can be formed by multiple segments connected together, such as shown here coupled together by a shock absorbing coupler 35. The arm 34 is pivotably coupled to the base 22 via an axle 44 that extends between the sides 32 of the base 22 (shown here supported by bearings 41 coupled to the inside surface of the sides 32). The axle 44 can be formed as extensions from the arm 34 (e.g., a casted part having a "t" shape), can be a separate element extending through an opening defined through the arm 34, or can be formed by two segments coupled to the arm 34 via a t-joint coupler 45 as shown. Additional information regarding the axle 44 is provided in U.S. patent application Ser. No. 17/185,289.

The arm 34 is pivotably coupled to the base 22 at a position between the first end 40 and the second end 42, and specifically closer to the first end 40 than to the second end 42. An optional gearset 43 is also provided, which provides for rotation of the arm 34 about its length between the first end 40 and second end 42 as the arm 34 is pivoted about the axle 44. Additional information regarding the gearset 43 and t-joint coupler 45 are provided in U.S. patent application Ser. No. 17/185,289. The arm 34 is shown pivotally coupled to the base via a t-joint coupler 45, which receives the arm 34 therethrough. Clamps 39 encircle the arm 34 on either side of the t-joint coupler 45 to maintain the axial position of the t-joint coupler 45 relative to the arm 34, while still allowing the arm 34 to rotate about its length within the t-joint coupler 45. In addition to the t-joint coupler 45 receiving or otherwise engaging with the axle 44 (which as stated above can be formed as separate segments), the t-joint coupler 45 includes a barrel 47 with an opening 49. The opening 49 extends parallel to the length of the axle 44. The barrel 47 pivots with t-joint coupler 45 about the axle 44 and does not rotate with the arm 34 along the length thereof. In this manner, the opening 49 in the barrel 47 provides a location for coupling an actuator to the arm 34 via the t-joint coupler 45, as discussed further below.

With continued reference to FIG. 2, the arm 34 is coupled to the propulsor 36, here with the second end 42 coupled to a collar 46 of the body of the propulsor 36 in a manner known in the art. The propulsor 36 is shown in FIG. 2 in a stowed position, but is movable into and between the stowed position and a deployed position (see e.g., FIGS. 6-7) by pivoting the arm 34. It should be recognized that the propulsor 36 is relatively distal from the marine vessel 1 when in the deployed position as compared to the stowed position.

Figure 3:
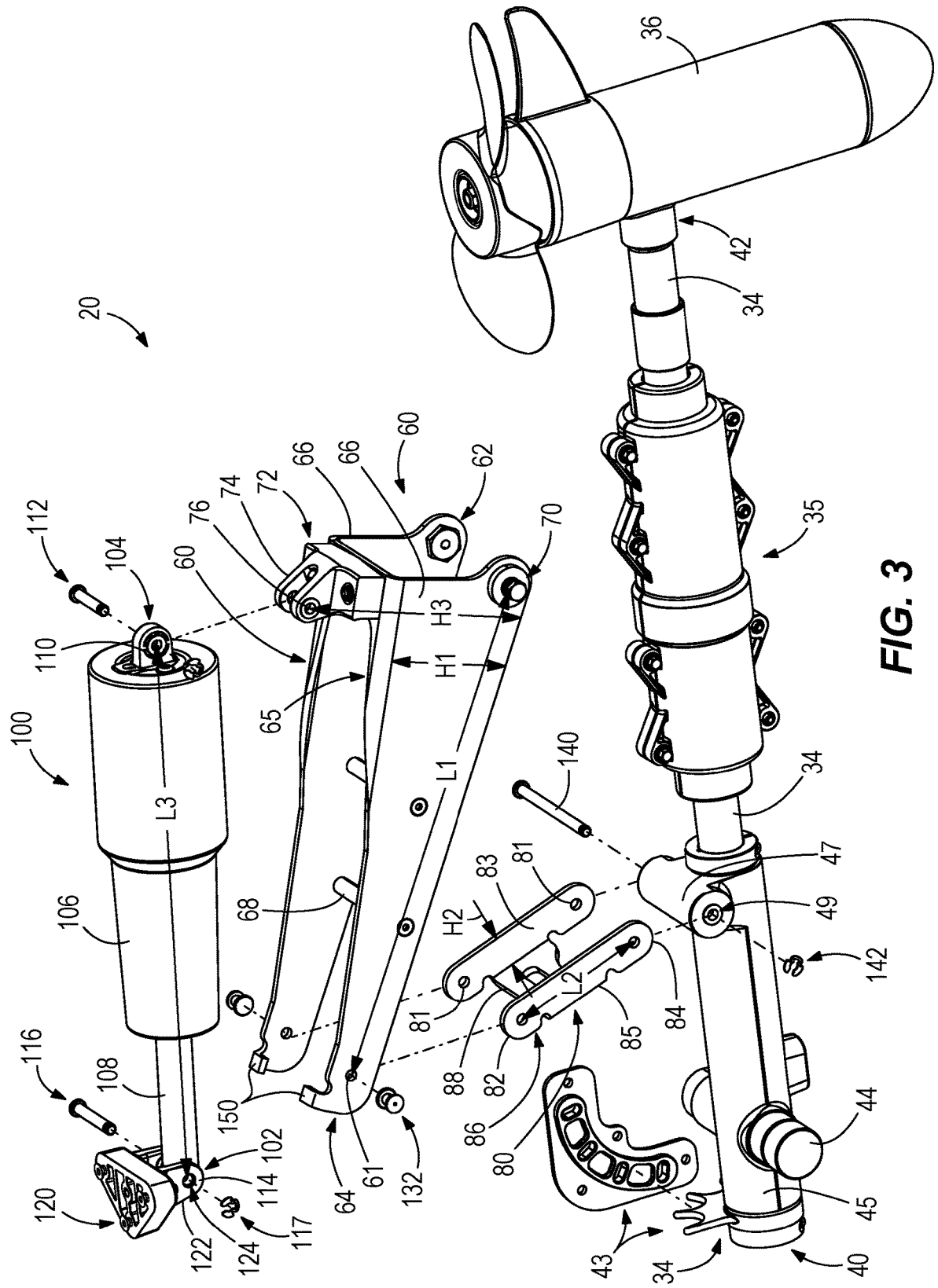
FIG. 3 is an exploded view of the device of FIG. 2.

As shown in FIG. 3, the arm 34 is pivotably into and between the stowed and deployed positions via an actuator 100 (also referred to as the "first" actuator), shown here to be a linear actuator of a type presently known in the art. The actuator 100 has a cylinder 106 that receives a rod 108 therein. The actuator 100 may be actuated hydraulically, pneumatically, and/or electro-mechanically to extend and retract the rod 108 within the cylinder 106, thereby changing a distance between a first end 102 and a second end 104 of the actuator 100. An opening 110 is defined at or near the second end 104 of the actuator, and likewise an opening 114 defined through the rod 108 at or near the first end 102 of the actuator. The openings 110, 114 are configured to receive fasteners 112, 116 therein (e.g., pins or bolts) for coupling the actuator 100 to other elements. A length L3 is defined between the openings 110, 114, which changes with actuation of the actuator 100 as described above. The length L3 is the distance between the first end 102 and the second end 104 of the actuator 100 (having a known offset to the openings 110, 114).

As shown in FIGS. 2 and 3, the first end 102 of the actuator 100 is pivotally coupled to the base 22 (to pivot about a first pivot axis PA1, FIG. 2) via a clevis 120. The clevis 120 is coupled to the top 28 of the base 22 via fasteners in a manner known in the art. Two fingers 122 of the clevis 120 extend downwardly away from the base 22, each defining an opening 124 therethrough. The first end 102 of the actuator 100 is pivotally coupled to the clevis 120 by extending the fastener 116 (e.g., a pin or bolt) through the opening 114 in the rod 108, and also through the openings 124 in the clevis. The fastener 116 is retained in place by engagement with a lock clip 117 (also referred to as a "C" clip), though other techniques such as cotter pins, threaded nuts (with corresponding threads on the fastener 116), and/or press-fit arrangements are also contemplated by the present disclosure, for example.

The second end 104 of the actuator 100 can alternatively be coupled to the arm 34 at a position between the first end 40 of the arm 34 and the axle 44, though this may result in increased strain on components and/or the actuator 100. To this end, the additional structures discussed below are provided for increased mechanical advantage for the actuator 100.

The device 20 of FIGS. 2 and 3 includes an actuator linkage 50 for coupling the actuator 100 to the arm 34 to provide pivoting thereof about the axle 44. The actuator linkage 50 includes a first link 60 that extends between a first end 62 and a second end 64 defining a length therebetween. The first link 60 is formed by two separate arms 66 connected by one or more members 68 therebetween in a manner known in the art. The arms 66 are parallel to each other. However, it should be recognized that the first link 60 (and likewise, the second link 80 discussed below) may have any number of individual arms 66, 86. It should further be recognized that using singular terms or using plural terms throughout the present disclosure is not limiting on how many arms 66, 86 the first link 60 and/or second link 80 have, respectively.

The first link 60 has sides 63 with heights H1 that extends between a top and bottom thereof, which may vary between the first end 62 and the second end 64. One or more top members 65 extends perpendicularly from the tops of the sides 63, which may also connect the arms 66 and is discussed further below. A clevis 72 is coupled to the first link 60, specifically to the top member 65 between the arms 66, such that the clevis 72 is positioned between the sides 63. The clevis 72 has two fingers 74 extending away from the top of the first link 60 with openings 76 defined therein.

As shown in FIGS. 2 and 3, the second end 104 of the actuator 100 is pivotally coupled to the actuator linkage 50, and specifically the first link 60 thereof, by inserting the fastener 112 through the openings 110, 76 in the actuator 100 and clevis 72, respectively. FIG. 3 shows the fastener 112 being retained in place via a press-fit engagement with the opening 76 in the clevis 72 (e.g., with a nylon insert sandwiched therebetween within the opening 76). However, other types of fasteners are also contemplated, such as a nut and bolt. In this manner, the actuator 100 is pivotally coupled to the first link 60 to pivot about a second pivot axis PA2 (FIG. 2) formed by the fastener 112.

With continued reference to FIGS. 2-3, projections 70 (e.g., studs) extend away from the sides 63 near the first end 62, which may be integrally formed therewith or subsequently coupled via fasteners, welding, adhesives, or other methods known in the art. Openings 61 are also defined through the first link 60 near the second end 64. A length L1 is defined between the opening 61 and the projection 70 of the first link 60. Projections 70 may also or alternatively be provided near the second end 64, and likewise openings 61 may also or alternatively be provided near the first end 62 to provide the same functions stated below.

The first link 60 is pivotally coupled to the base 22 (to pivot about a third pivot axis PA3, FIG. 2) by the projections 70 extending from the sides 63 of the first link 60 extending into the openings 130 in the sides 32 of the base 22. It should be recognized that the first link 60 may be pivotally coupled by other methods, such as bolts or other fasteners with corresponding nuts engaged from the outside of the sides 32. Additionally, bushings and/or washers (e.g., made of Delron® or nylon) may be provided with the projections 70 to reduce friction and wear between the first link 60 and the base 22. It should be recognized that such bushings and/or washers may also or alternatively be used in conjunction with the fasteners and mounting hardware of any joint throughout the disclosed device 20.

Figure 5:
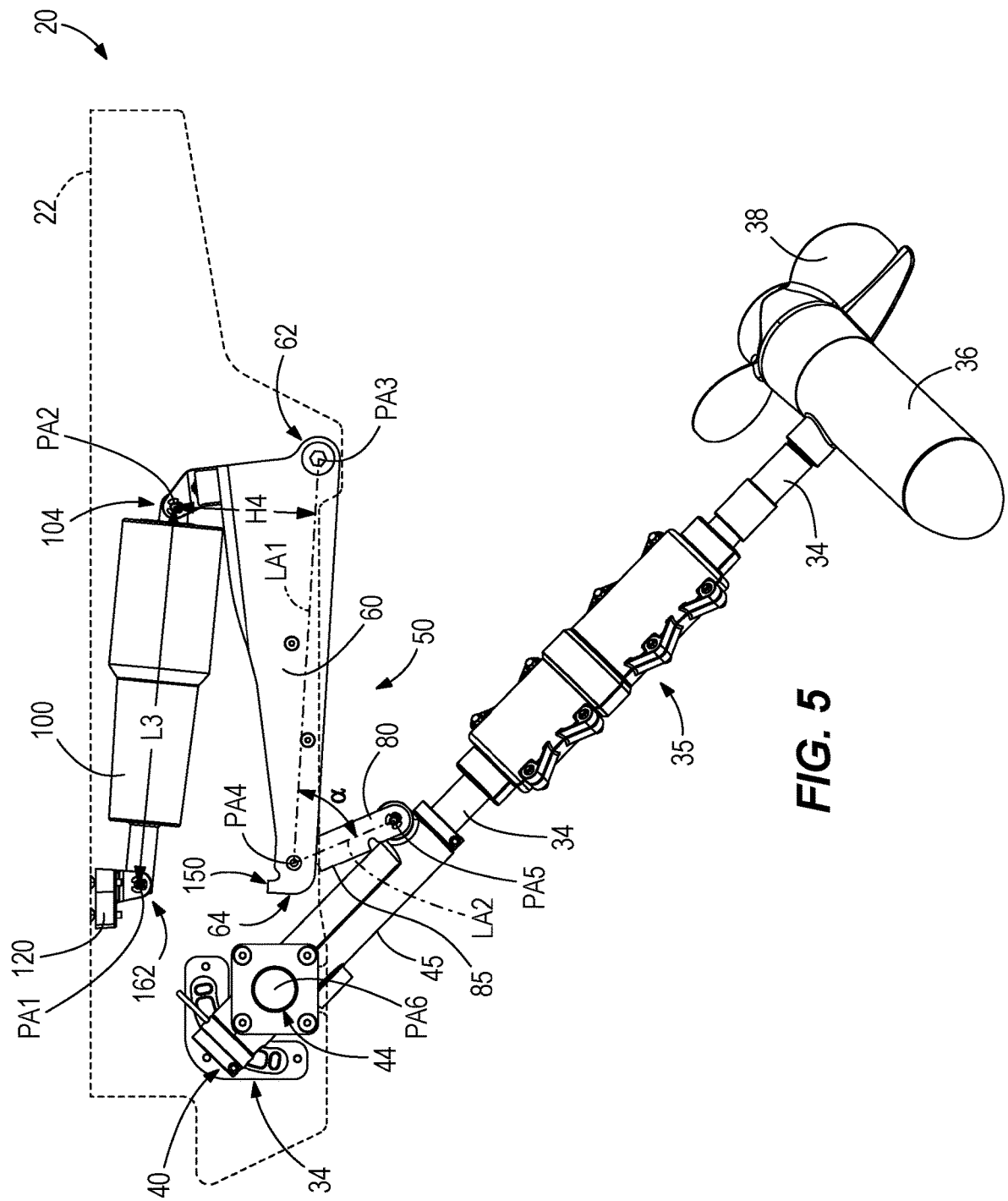
FIG. 5 is a right view of the device of FIG. 4 in an intermediate position between the stowed position and a deployed position.

In certain configurations (such as shown in FIG. 5), offsetting the second pivot axis PA2 and the third pivot axis PA3 (the offset being shown as H4) provides additional mechanical advantage by increasing the leverage provided to the actuator 100.

Returning to FIGS. 2-3, the actuator linkage 50 further includes a second link 80 that extends between a first end 82 and a second end 84 defining a length therebetween. The second link 80 is also formed by two separate arms 86 connected by one or more members 88 in a manner known in the art. The arms 86 are parallel to each other. The second link 80 has sides 83 with heights H2 that extends between a top 85 (FIG. 3) and bottom thereof, which may vary between the first end 82 and the second end 84. Openings 81 are defined through the second link 80 near the first end 82 and also near the second end 84. A length L2 is defined between the openings 81.

The second end 64 of the first link 60 is pivotally coupled to the first end 82 of the second link 80 to pivot about a fourth pivot axis PA4. A fastener 132 extends through the openings 61, 81 in the first link 60 and the second link 80, which is shown here as a rivet for each of the individual arms 66, 86. Other types of fasteners 132 are also contemplated, including a pin with corresponding cotter pin, threaded bolt and corresponding nut, or other fasteners known in the art.

With continued reference to FIGS. 2-3, the second end 84 of the second link 80 is pivotally coupled to the arm 34 to pivot about a fifth pivot axis PA5, here at the t-joint coupler 45. In particular, a fastener 140 extends through the opening 81 in the second link 80 and also through the opening 49 defined in the barrel 47 of the t-joint coupler 45, whereby the fastener 140 engages with corresponding fastener 142 to remain in place. The fasteners 140, 142 are a pin and a corresponding a lock clip, respectively, similar to that shown for the second pivot axis PA2. However, other types of fasteners are also contemplated by the present disclosure (e.g., a nut and a bolt).

Figure 4:
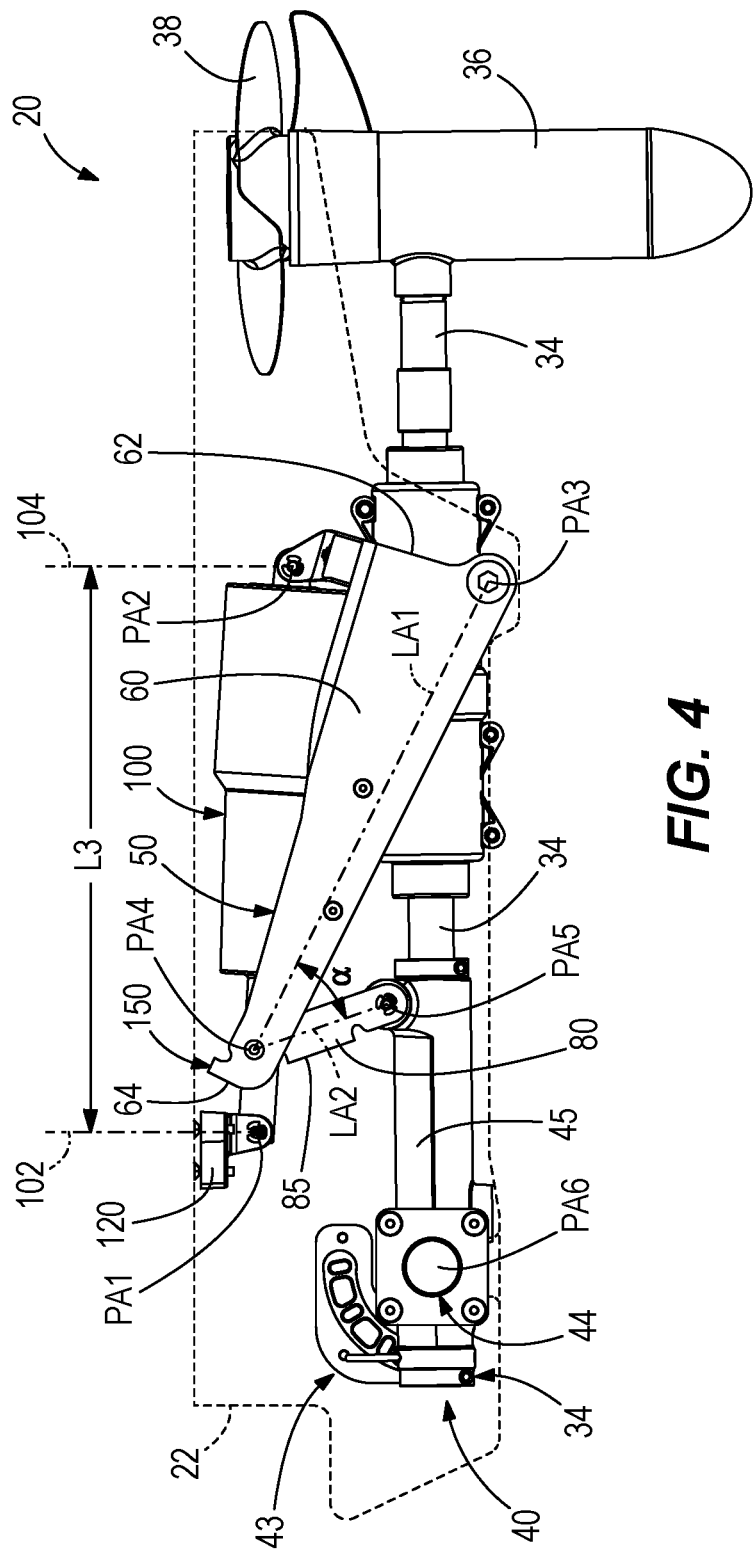
FIG. 4 is a right view of a device according to the present disclosure in a stowed position with the second actuator removed for clarity.

FIGS. 2-3 further show a configuration of device 20 having a stop 150 that limits how far the first link 60 may pivot relative to the second link 80 (limiting rotation about the fourth pivot axis PA4). The stop 150 is coupled to the first link 60 (which may be provided via integral formation, bending, welding, fasteners, or other methods known in the art). The stop 150 may alternatively be coupled to the second link 80 or the base 22 to the provide the same function. As shown in FIGS. 2 and 4, an angle α is defined between a first linear axis LA1 extending between the third pivot axis PA3 and the fourth pivot axis PA4, and between a second linear axis LA2 extending between the fourth pivot axis PA4 and the fifth pivot axis PA5. The stop 150 is two stops 150 formed by two separate tabs that extend perpendicularly inwardly from the tops of the arms 66 of the first link 60, here near the second end 64. By extending perpendicularly inwardly, the stops 150 are positioned to (at a certain angle α) engage the tops 85 of the arms 86 forming the second link 80 to prevent further rotation, as discussed further below.

Figure 6:
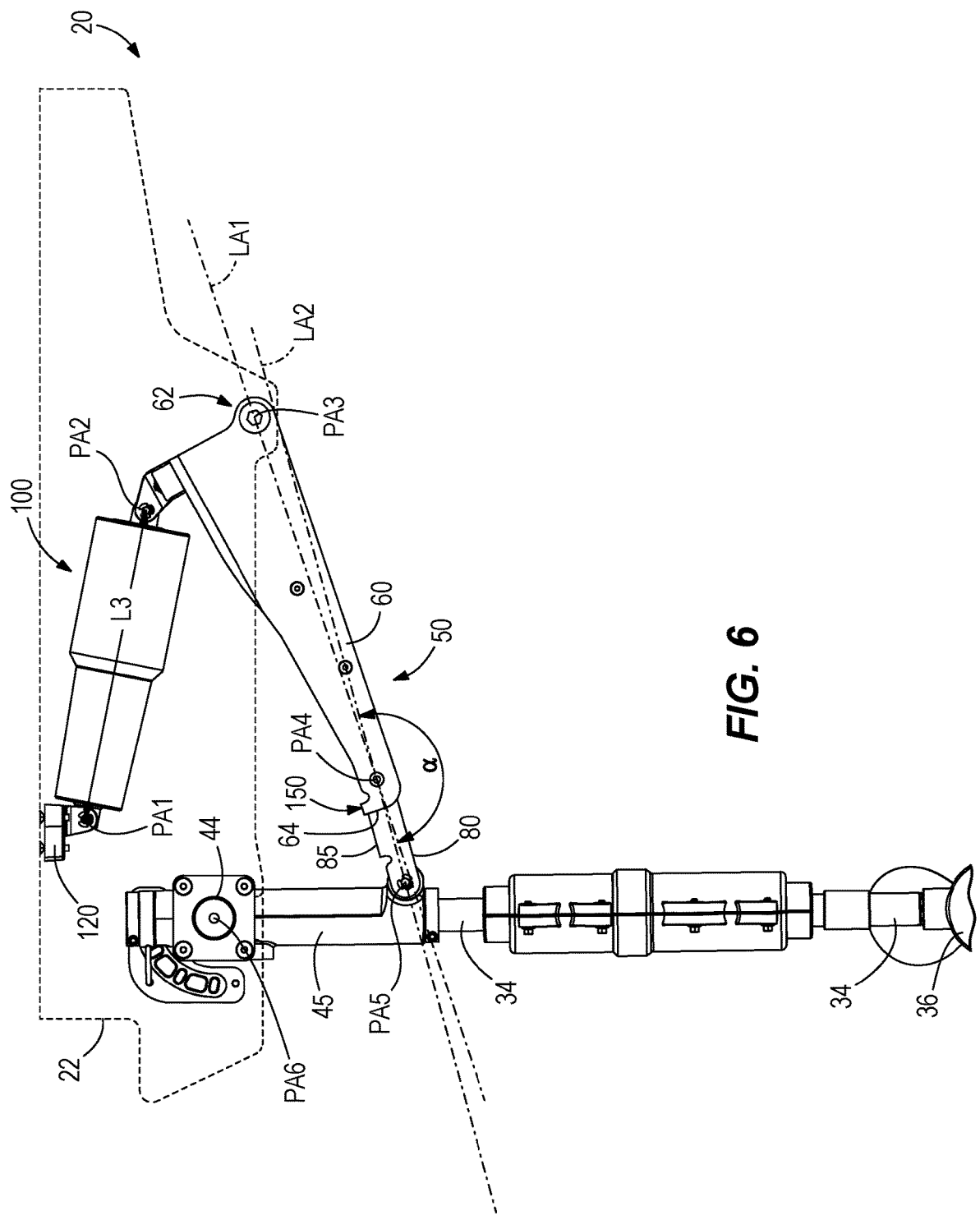
FIG. 6 is a right view of the device of FIG. 4 in the deployed position.
Figure 7:
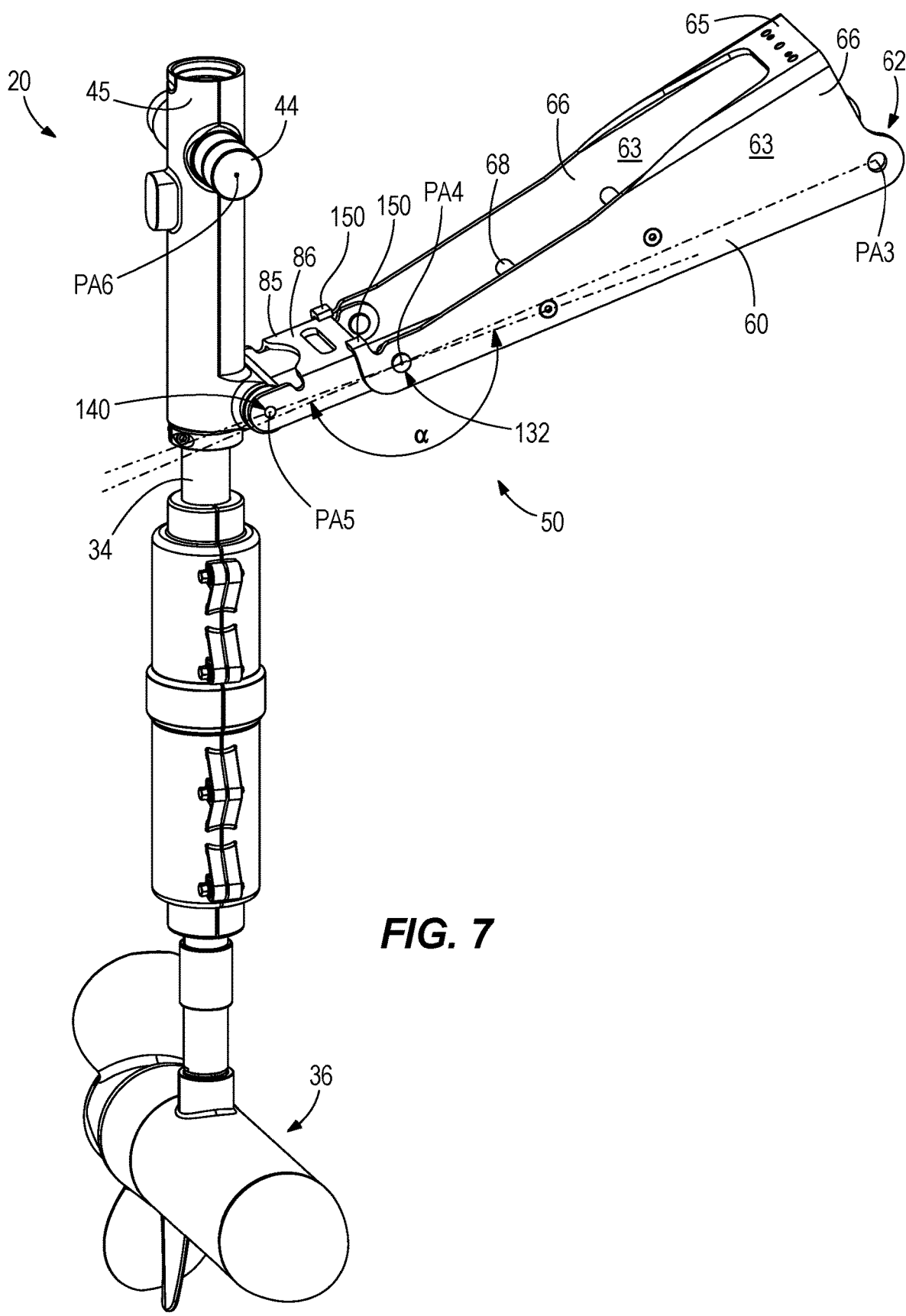
FIG. 7 is a right perspective view of the device of FIG. 6 in the deployed position.

FIGS. 4-7 depict the progression of the device 20 pivoting the arm 34 from the stowed position (FIG. 4) to the deployed position (FIGS. 6-7). In the configuration shown, retraction of the actuator 100 (reducing the length L3 between the first end 102 and the second end 104) causes the actuator linkage 50 to pivot the arm 34 about the axle 44 towards the deployed position. In particular, the actuator 100 causes the first link 60 to pivot about the third pivot axis PA3 (here, counter-clockwise) such that the second end 64 of the first link 60 moves downwardly, away from the base 22. The process is assisting by gravity, which provides a constant downward force on the mass of the actuator linkage 50 itself, as well as on the masses of the actuator 100 and the propulsor 36 coupled to the actuator linkage 50. It should be recognized that the actuator 100 may positioned other than as shown, including being positioned such that extension (rather than retraction) causes rotation of the arm 34 towards the deployed position. However, the configuration shown is advantageously compact when in the stowed position, providing a smaller package for installation, less drag in the water, and improved clearance for trailering the marine vessel.

With continued reference to FIGS. 4-7, rotation of the first link 60 allows the arm 34 to pivot downwardly towards the deployed position (here, clockwise about the axle 44), supported by the second link 80 connecting to the first link 60. For the configuration shown, the angle α between the first linear axis LA1 extending between the third pivot axis PA3 and the fourth pivot axis PA4, and the second linear axis LA2 extending between the fourth pivot axis PA4 and the fifth pivot axis PA5, begins at less than 180 degrees (and here less than 90 degrees) when in the fully stowed position (FIG. 4). For example, the angle α may be 30 degrees, 45 degrees, or other angles below 180 degrees when in the stowed position. As the arm 34 pivots towards the deployed position, the angle α increases to be 180 degrees when the propulsor 36 is nearly in the deployed position (i.e., the arm 34 extends nearly vertically downwardly), It can be advantageous to configure the actuator linkage 50 (and the device 20 more generally) such that the angle α is greater than 180 degrees when the propulsor 36 is in the fully deployed position (FIGS. 6-7). In particular, by configuring the actuator linkage 50 to be "over-center" (the angle α exceeding 180 degrees), any forces exerted on the propulsor 36 or arm 34 are transferred to the contact between the stops 150 and the second link 80, and thus cannot be transferred to the actuator 100. This effectively locks the device 20 in the deployed position until the actuator 100 moves the actuator linkage 50 in an opposite direction to pivot the propulsor 36 towards the stowed position.

Furthermore, the additional leverage provided by the first length L1 of the first link 60 and the second link L2 of the second link 80 (along with the relative points of pivoting between the first link 60, the second link 80, and the base 22) greatly increase the mechanical advantage of the system to reduce the strain on the actuator 100. This increases durability and reliability, while also improving performance and the control of movement for the arm 34.

By way of additional non-limiting examples, additional attributes of particularly advantageous devices 20 include those in which:

retraction of the linear actuator moves the propulsor into the deployed position and extension of the linear actuator moves the propulsor into the stowed position;

the arm is pivotally coupled to the base at a sixth pivot axis, and the second pivot axis is horizontally closer to the sixth pivot axis when the propulsor is in the deployed position than when the propulsor is in the stowed position;

the arm is pivotally coupled to the base at a sixth pivot axis, and the propulsor is closer to the fifth pivot axis than to the sixth pivot axis;

the fourth pivot axis is horizontally closer than the fifth pivot axis to the sixth pivot axis when in the stowed position, and the fifth pivot axis is horizontally closer than the fourth pivot axis to the sixth pivot axis when in the deployed position;

the fifth pivot axis remains vertically below the fourth pivot axis while pivoting between the stowed and deployed positions;

the third pivot axis is vertically above the fourth pivot axis when the propulsor is in the deployed position, and the fourth pivot axis is vertically above the third pivot axis when the propulsor is in the stowed position;

the angle α between the first link and the second link is greater than 180 degrees but less than 210 when the propulsor is in the deployed position; and/or the angle α between the first link and the second link is less than 90 degrees when the propulsor is in the stowed position.

In this manner, the devices and methods described herein provide stability and durability when the propulsor is in the deployed position.

The present inventors have recognized the need for an alternative mechanism for stowing the propulsor when the first actuator fails or is otherwise inoperable, such as from striking an object in the water. Moreover, there is a need for a solution that does not require the operator to enter the water and manually force the propulsor into the stowed position, which can be both challenging and dangerous.

Figure 8:
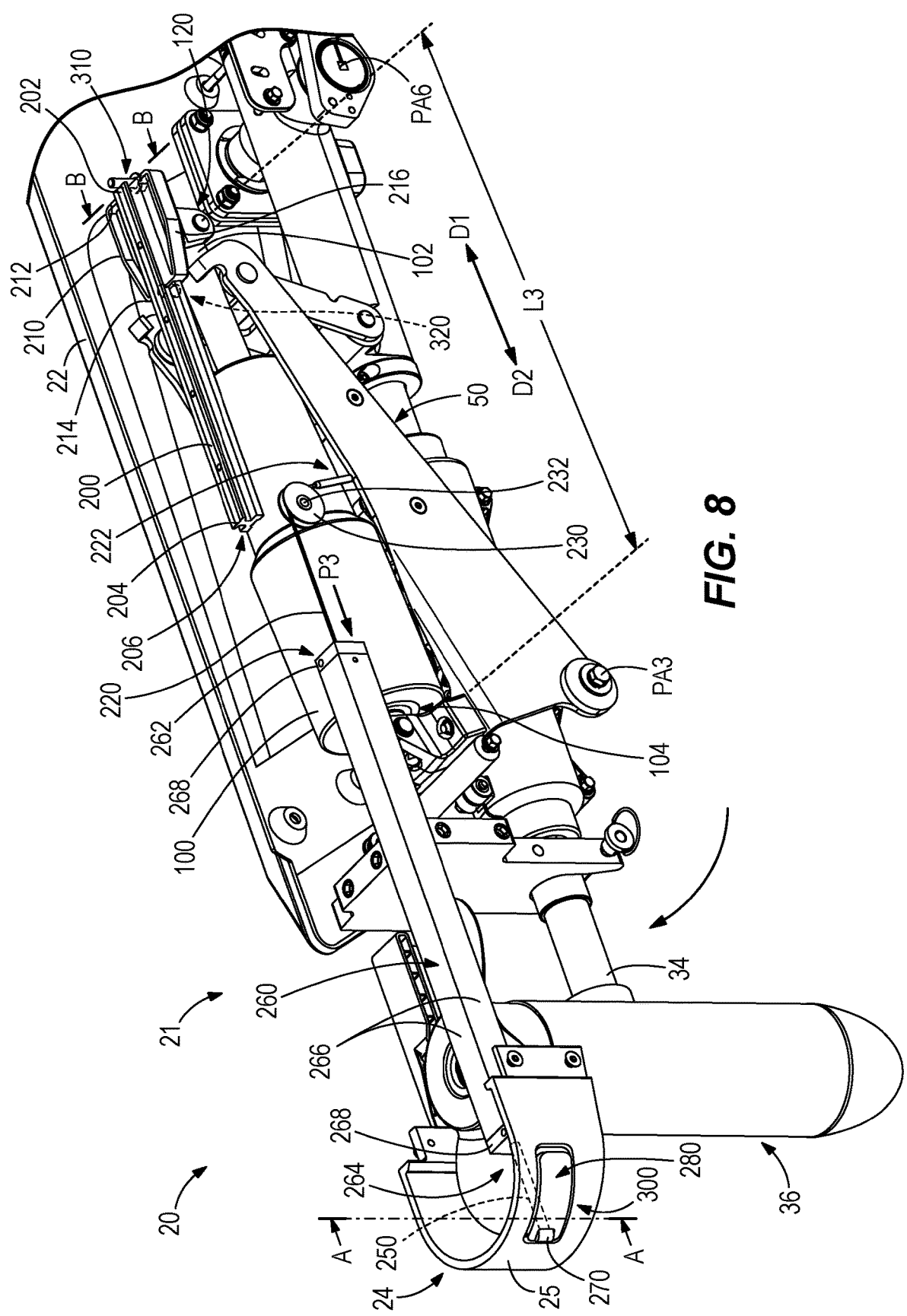
FIG. 8 is a left perspective view of a stowable propulsion device, positioned in the stowed position via the first actuator.
Figure 9:
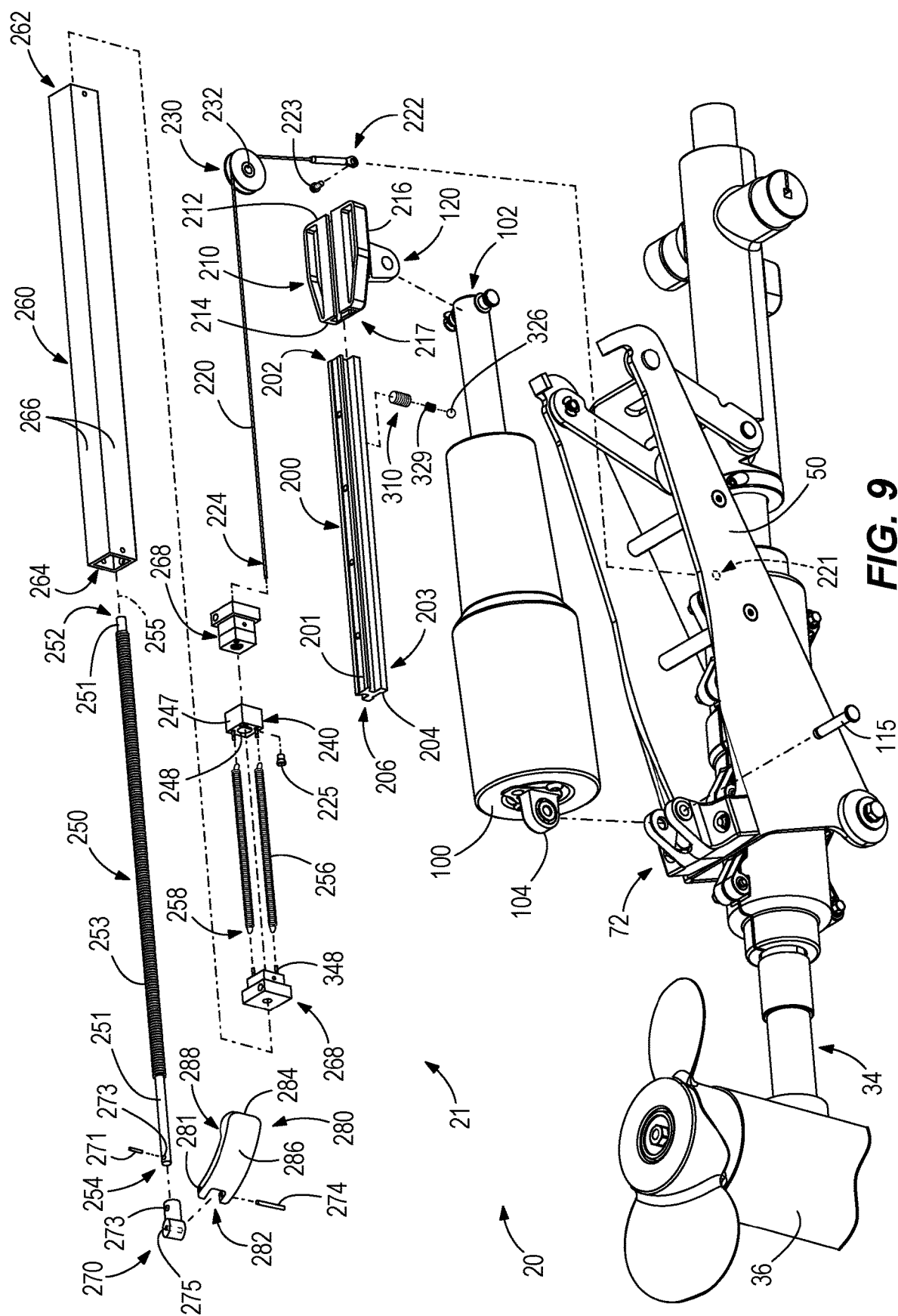
FIG. 9 is an exploded partial view of the stowable propulsion device of FIG. 8.

FIGS. 8 and 9 show a device 20 according to the present disclosure having both a first actuator (actuator 100) as discussed above, along with a second actuator 21 to be discussed herein. The actuator 100 is shown as a linear actuator, but could alternatively be an electric screw-actuator, a worm drive, or other devices for pivoting the arm 34 via the actuator linkage 50 to move the propulsor 36 into and between the stowed and deployed positions.

Referring to FIG. 9, the second actuator 21 includes a cable 220 that extends between a first end 222 and a second end 224. The first end 222 has a ring terminal through which the cable 220 is coupled to the actuator linkage 50 via a fastener 223 (e.g., a screw or rivet) engaged with an opening 221 in the actuator linkage 50. The actuator linkage 50 is coupled between the arm 34 and the base 22 in the manner described above.

Figure 10:
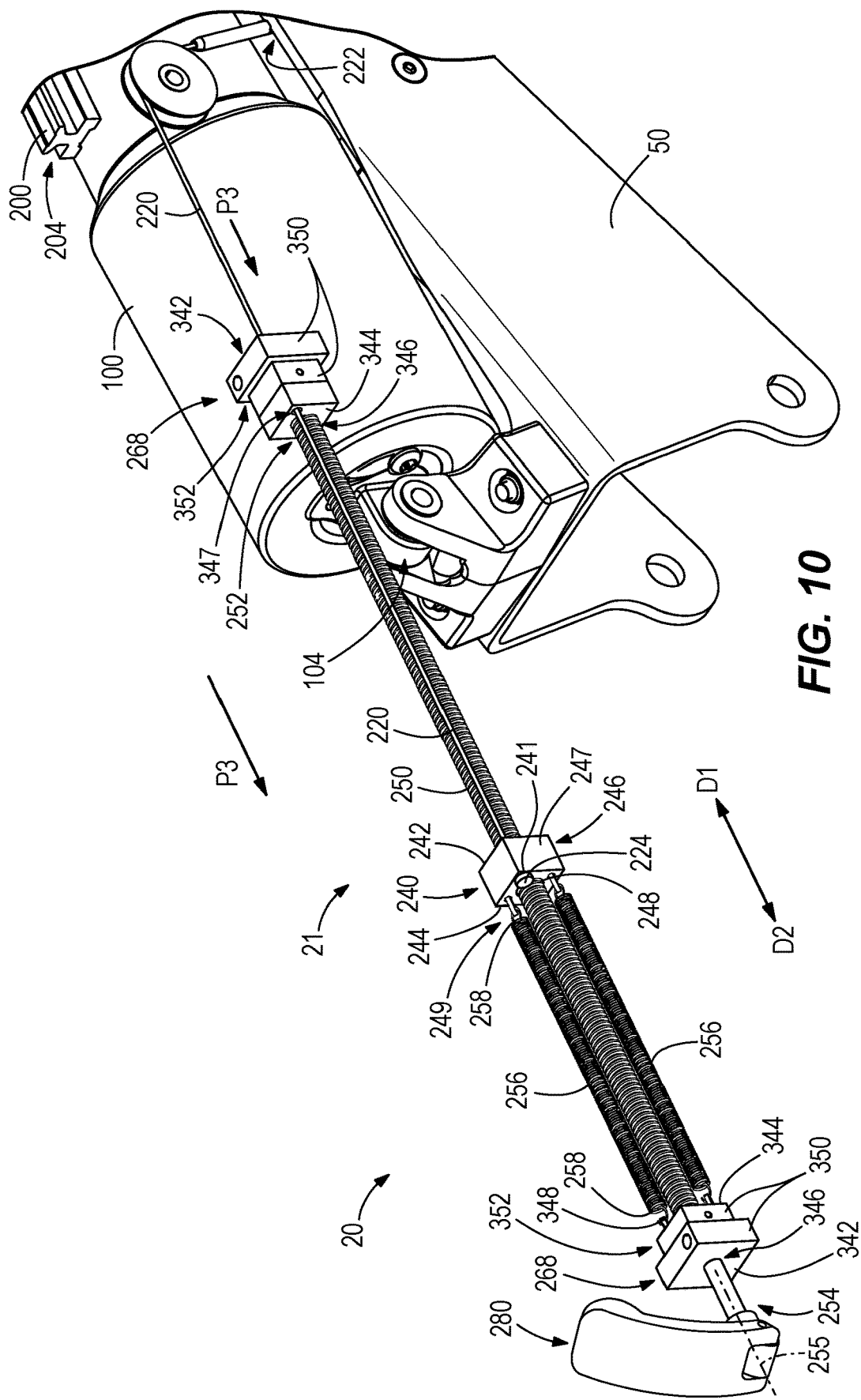
FIG. 10 is a left perspective view showing the inside of the second actuator of FIG. 8.

The cable 220 is supported by a pulley 230, which rotates about an axle 232 coupling the pulley 230 to the base 22. The second end 224 of the cable 220 is coupled to a block 240 (also known as a nut block). As shown in FIG. 10, the block 240 extends from a first end 242 to a second end 244 with sides 247 therebetween. The block 240 has a squared cross section with edges 246 formed between the sides 247.

The block 240 may alternatively have a cross section that is rectangular, triangular, an oval, a shape with notches or extensions at the perimeter, for example. An opening 241 is formed through the block 240, through which the cable 220 extends to its second end 224. The second end 224 of the cable 220 has an enlarged head 225 coupled thereto to prevent the cable 220 from pulling through the block 240. It should be recognized that the second end 224 of the cable 220 may be coupled to the block 240 using various methods known in the art (e.g., including welding, integral formation, or crimping).

An opening 248 also extends through the block 240 between the first end 242 and the second end 244, which is threaded. Referring to FIG. 9, threads of the opening 248 engage with corresponding threads 253 of a rod 250 that extends along an axis 255 between a first end 252 and a second end 254. The rod 250 also includes unthreaded segments 251 at the first end 252 and the second end 254 thereof. In this manner, the diameter of rod 250 varies between the first end 252 and the second end 254, being larger along the threads 253 than in the unthreaded segments 251.

With reference to FIG. 8, the second end 254 of the rod 250 extends through an endcap 25 that forms the front 24 of the device 20. The front 24 is shown to have a curved contour. Referring to FIG. 9, a swivel joint 270 is non-rotatably coupled to the rod 250 via a fastener 271 (e.g., a rivet or nut and bolt) that extends through openings 273 in the swivel joint 270 and in the rod 250. The openings 273 are slots elongated along the axis 255 of the rod 250, which allows some axial movement of the swivel joint 270 relative to the rod 250.

A handle 280 is coupled to the second end 254 of the rod 250 via the swivel joint 270. The handle 280 extends between a first end 282 and a second end 284 with an inside 288 and an outside 286 therebetween. The second end 284 is configured to be grasped by the operator during use. The first end 282 of the handle 280 is pivotally coupled to the swivel joint 270 via a pin 274 (e.g., a rivet, cotter pin, screw, or nut and bolt). The pin 274 is received through openings 281 in the handle 280 and an opening 275 in the swivel joint 270. The handle 280 is pivotable about the pin 274, relative to the rod 250, between a closed position for storage (FIGS. 8 and 9) and an open position for use as discussed below.

With continued reference to FIGS. 8 and 9, the outside 286 of the handle 280 is curved to correspond to the contour of the front 24 of the endcap 25 when the handle 280 is in the closed position. Additionally, as shown in FIG. 9, a recess 300 is provided in the front 24 of the endcap 25 and has a size, shape, and depth corresponding to the size, shape, and depth of the handle 280. The handle 280 is therefore recessed within the recess 300 such that the outside 286 is generally flush with the front 24 of the endcap 25 when in the closed position. This provides protection for the handle 280 (e.g., avoids accidental rotation of the handle 280), and provides a desirable aesthetic for the device 20.

The curved shape of the handle 280 also provides that the second end 284 is farther from the front 24 of the endcap 25 in the open position than in the closed position, providing clearance between the handle 280 and the endcap 25. The movement provided between the swivel joint 270 and the rod 250 (via the openings 273 therein being elongated slots as discussed above) allows further clearance between the handle 280 and the endcap 25.

The present disclosure contemplates other shapes of handles 280, and other methods for coupling the handle 280 to the second end 254 of the rod 250. In one example, the second end 254 of the rod 250 has a hex shape and the handle 280 includes a corresponding female hex shaped opening into which the second end 254 of the rod 250 can be inserted. The female hex shaped opening may extend inwardly into the outside 286 of the handle 280, and/or be formed within a boss extending from the outside 286 of the handle 280. In this manner, the handle 280 functions similarly to a box wrench, in particular being engaged with the second end 254 of the rod 250 when in use, and removed and stowed when not in use.

With continued reference to FIGS. 8 and 9, the device 20 further includes a sheath 260 that extends parallel to the rod 250 with one or more sides 266 that extend between a first end 262 and a second end 264. The sheath 260 is fixed relative to the base 22 (e.g., coupled via screws, rivets, or welds). The sheath 260 of FIGS. 8 and 9 has a squared cross section that encloses the block 240 on its four sides 266. However, the sheath 260 may alternatively engage the block 240 only between one side 266 and one side 247 (or edge 246), respectively.

Figure 11:
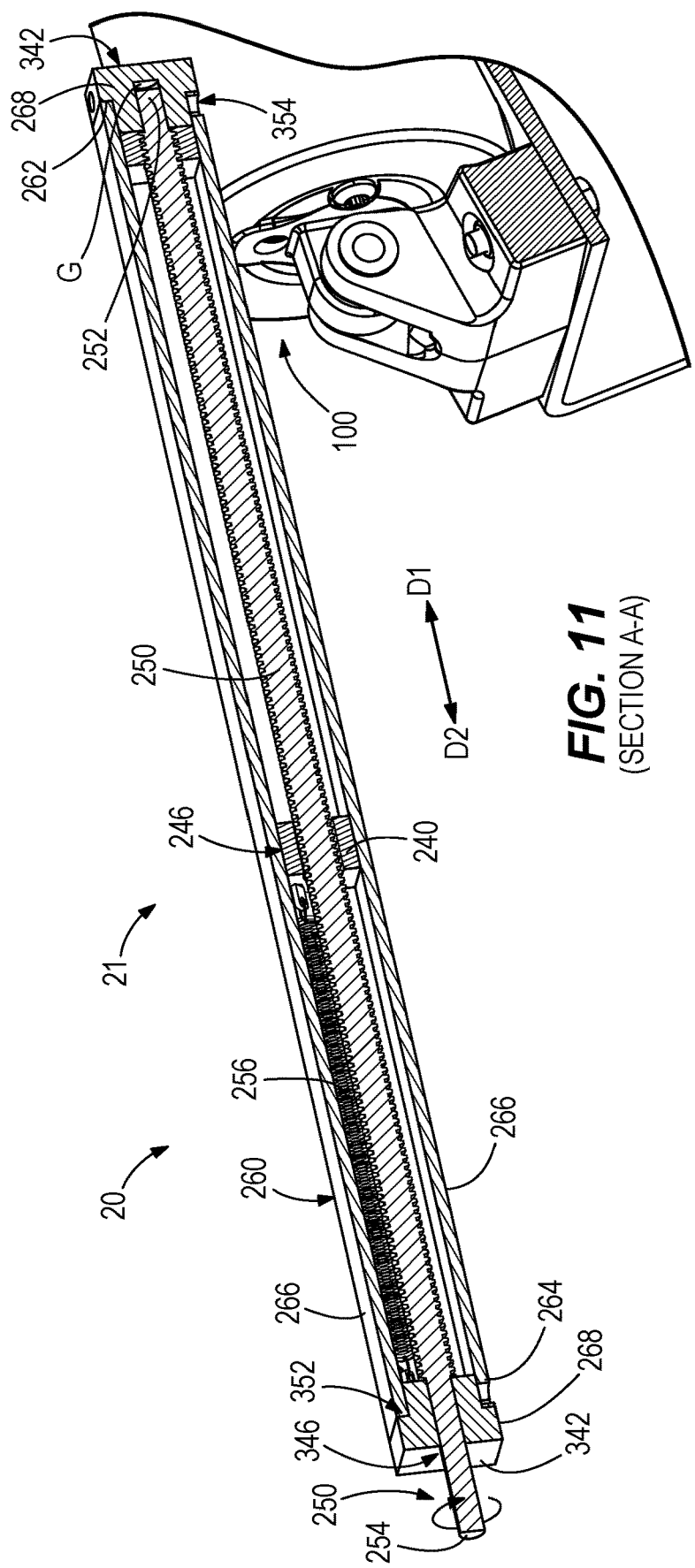
FIG. 11 is a left perspective view showing a sectional view of the inside of the second actuator taken along the line A-A in FIG. 8.

With reference to FIGS. 10 and 11, endcaps 268 are provided at one or both of the first end 262 and second end 264 of the sheath 260 (the sheath 260 being shown in FIG. 11). The endcaps 268 each extend between a first end 342 and a second end 344 with sides 350 therebetween. An opening 346 in each of the endcaps 268 and is configured to receive either the first end 252 or the second end 254 of the rod 250 therein. In the case of the endcap 268 near the first end 252 of the rod 250, the opening 346 is not entirely through the first end 342 of the endcap 268, thereby enclosing the first end 252 of the rod 250 and preventing movement in the first direction D1. A gap G (FIG. 11) is provided between the first end 252 of the rod 250 and the end of the opening 346 for the endcap 268 to accommodate tolerancing variation of the various components and to allow for smooth rotation of the rod 250. The endcap 268 nearest the first end 252 of the rod 250 also defines an opening 347 therethrough, which allows the cable 220 to pass through the endcap 268 to the block 240.

It should be recognized that movement of the rod 250 in the first direction D1 may be limited by other mechanisms, such as the opening 346 in the endcap 268 having a smaller diameter than the threads 253 of the rod 250. In contrast, the opening 346 for the endcap 268 nearest the second end 254 of the rod 250 is defined entirely therethrough. This allows the rod 250 to extend through the endcap 268 to be rotatable via the handle 280 as discussed above (see FIG. 9).

With continued reference to FIGS. 10 and 11, for each endcap 268 the sides 350 at the first end 342 extend farther from the opening 346 than at the second end 344, thereby forming a shelf 352. The difference in sizing along the sides 350 corresponds to the thickness of the sides 266 of the sheath 260. This provides that the larger sides 350 of the endcaps 268 (nearest the first ends 342) are flush with the outside of the sheath 260 when the endcaps 268 are assembled therewith. Similarly, the smaller sides 350 are configured to be received within the sheath 260. The endcaps 268 may be retained in place within the sheath 260 via press-fit arrangement, set-screws, adhesives, welding, crimping, and/or other methods known in the art.

FIGS. 10 and 11 further show a configuration in which the block 240 is biased in the second direction D2 to provide constant tension to prevent slack in the cable 220. In particular, hooks 249 are provided on the second end 244 of the block 240, which face the endcap 268 nearest the second end 254 of the rod 250. Hooks 348 are also provided at the second end 344 of the endcap 268, which face the block 240. One or more biasing members, such as springs 256 having loops on opposing ends 258, are stretched between the hooks 249, 348 and provide tensile force to bias the block 240 towards the second end 254 of the rod 250 in the second direction D2.

It should be recognized that other biasing mechanisms and are also contemplated by the present disclosure. Alternative biasing members include those providing compressive forces (e.g., forcing the block 240 in the second direction D2 from the first end 242 of the block 240), elastomers (either tensile or compressive forces), or gas springs). Likewise, the biasing members may be connected to the endcap 268 and/or block 240 by other mechanisms, for example via integral formation, rivets, welds, or loops engageable by hooks at the ends of the biasing members.

In this manner, FIG. 10 shows that the block 240 is therefore biased in the second direction D2 by the springs 256, but is linearly translated via rotation of the handle 280. In particular, rotating the handle 280 rotates the rod 250 about its axis 255. Referring to FIG. 11, the engagement between the sheath 260 and the block 240 prevents rotation of the block 240 relative to the sheath 260. As such, rotating the rod 250 about its axis 255 causes the block 240 to translate along the rod 250 due to the threaded engagement between the rod 250 and the block 240. When the block 240 is linearly translated in the second direction D2, this generates a pulling force in a pulling force direction P3 (FIG. 10) on the second end 224 of the cable 220 (which is carried by the block 240). Returning to FIG. 8, the pulley 230 changes the direction in which the pulling force on the cable 220 is provided at the first end 222, which is coupled to the actuator linkage 50. Pulling the cable 220 in the pulling force direction P3 therefore causes the arm 34 to rotate (via the actuator linkage 50) to pivot the propulsor 36 toward the stowed position. It should be recognized that greater or fewer pulleys 230 may be used, depending upon the desired direction for the pulling force direction P3, and/or to gain mechanical advantage for stowing the propulsor 36.

The present inventors have further recognized a need for coupling the actuator 100 so as to allow the propulsor 36 to be stowed while the actuator 100 is inoperable. As described above, the propulsor 36 is pivoted from the deployed position to the stowed position by increasing the length L3 of the actuator 100. The length L3 is fixed when the actuator 100 is inoperable. Moreover, when the first end 102 and the second end 104 of the actuator 100 are also translationally fixed relative between the base 22, the inoperable actuator 100 prevents the arm 34 coupled thereto from pivoting (thereby preventing stowing the propulsor 36). However, both ends of the actuator 100 must be translationally fixed when the actuator 100 is operator, otherwise changing the length L3 would not cause the arm 34 to pivot. Therefore, at least one of the ends of the actuator 100 must be translationally fixed when using the actuator 100, but translatable to stow the propulsor 36 when not using the actuator 100.

Returning to FIGS. 8 and 9, the device 20 includes a rail 200 having a top 201 and a bottom 203 that extend between a first end 202 and a second end 204. The rail 200 has a t-shaped cross sectional profile 206. The rail 200 is coupled to the base 22 via fasteners (e.g., screws, nuts and bolts, welds, and/or integral formation, not shown). The first direction D1 discussed above with respect to the block 240 is also defined as extending along the rail 200 from the second end 204 to the first end 202, with the second direction D2 extending along the rail 200 from the first end 202 to the second end 204.

With continued reference to FIGS. 8 and 9, a carriage 210 is translatable on the rail 200. The carriage 210 extends between a first end 212 and a second end 214 with sides 216 therebetween. The carriage 210 has a cross sectional profile 217 corresponding to the profile 206 of the rail 200. The corresponding profiles 206, 217 prevent the carriage 210 from moving (relative to the rail 200) other than in translation in the first direction D1 and in the second direction D2. In other words, the engagement of the carriage 210 with rail 200 prevents movement in the vertical and transverse directions, and also prevents rotation of the carriage 210 relative to the rail 200. It should be recognized that while the block 240 and carriage 210 are each described as being movable along parallel axes in the first direction D1 and the second direction D2, these need not be parallel in any plane to be operational.

A clevis 120 extends downwardly from the carriage 210. The actuator 100 is pivotally coupled to both the clevis 120 and the arm 34 (via the actuator linkage 50) in the manner described above. The clevis 120 is shown to be integrally formed with the carriage 210, but may alternatively be coupled thereto (e.g., via threaded fasteners such as screws or bolts, welds, and/or rivets).

Figure 12:
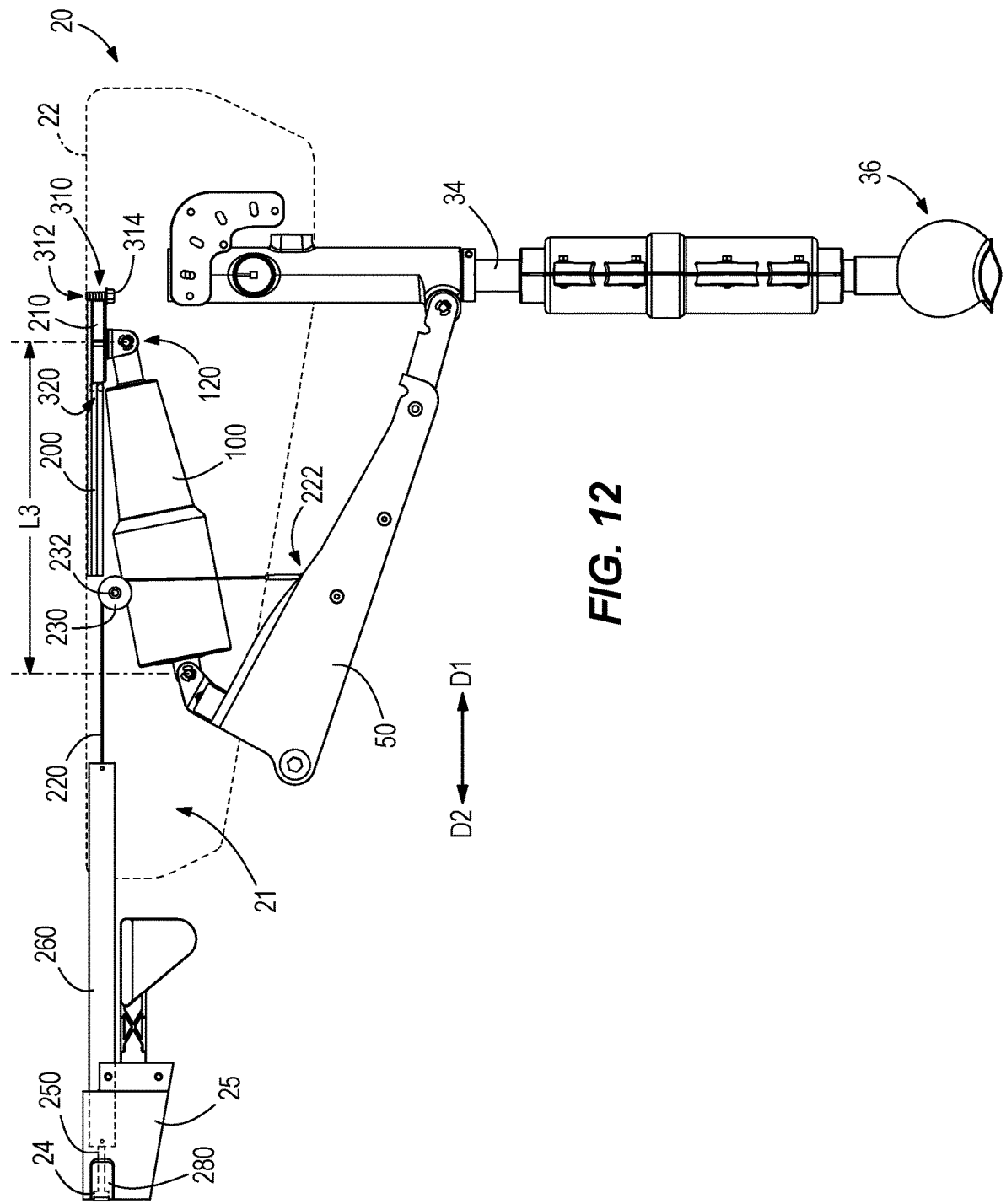
FIG. 12 is a left view of the stowable propulsion device of FIG. 8, positioned in the deployed position via the first actuator.
Figure 13:
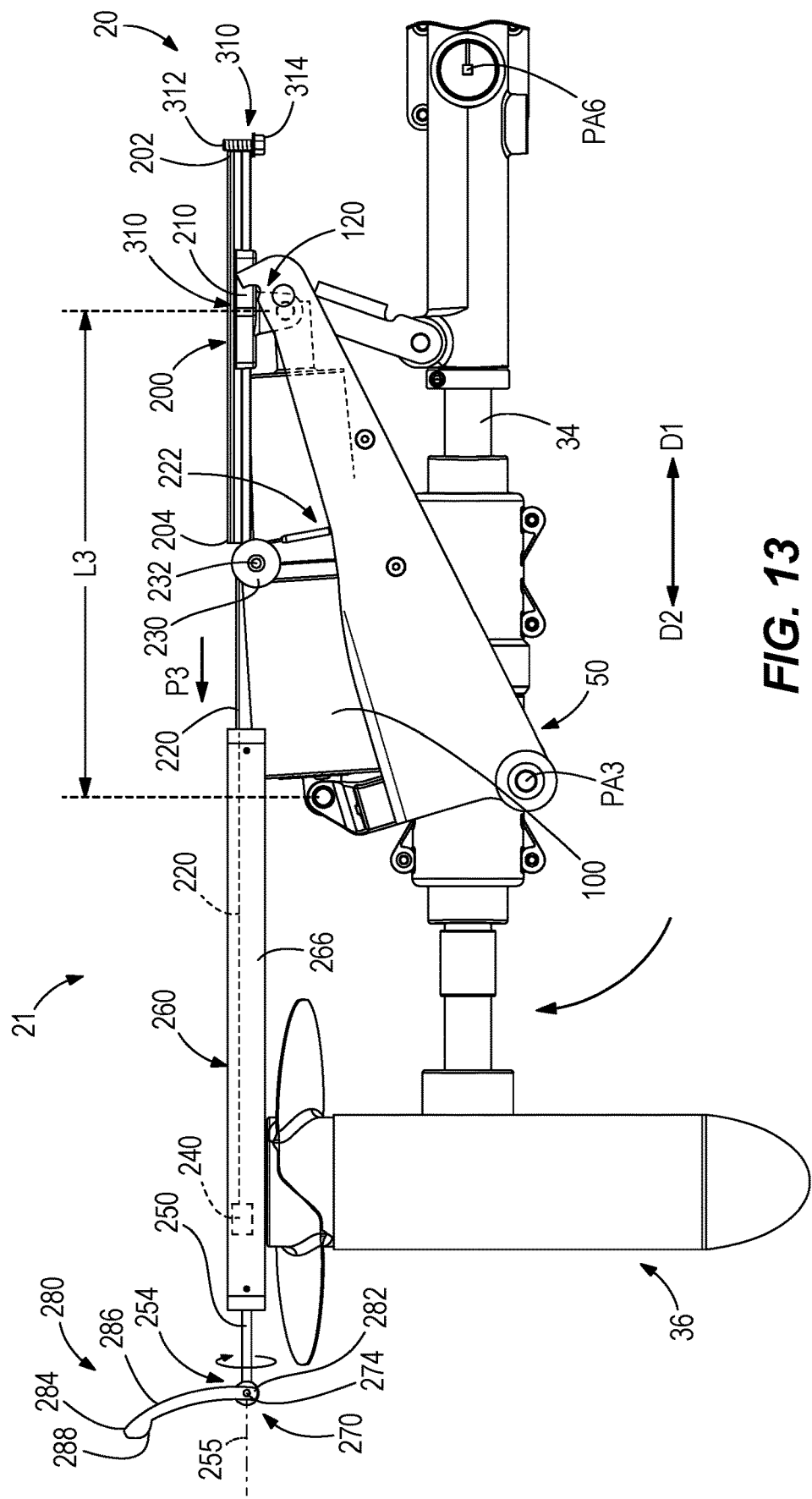
FIG. 13 is a left view of the stowable propulsion device of FIG. 8, positioned in the stowed position via the second actuator.

As shown in FIGS. 12 and 13, a stop member 310 is positioned at or near the first end 202 of the rail 200 and limits the extent to which the carriage 210 may move in the first direction D1. The stop member 310 is a threaded fastener (e.g., a bolt) that extends from a first end 312 to a second end 314. The first end 312 is shown threadingly engaged with a threaded opening in the base 22, but may alternatively be threaded into a threaded opening in the rail 200. The second end 314 of the stop member 310 has a hexagonally shaped head such that a wrench or other tool can be used to rotate the stop member 310 for installation and/or removal.

The present inventors have recognized that the mass of the propulsor 36 (along with that of the arm 34, actuator linkage 50, and/or other components) results in a constant gravitational force tending to pivot the propulsor 36 towards the deployed position. This creates a constant force on the carriage 210 in the first direction D1, thereby forcing the carriage 210 into the stop member 310. Therefore, the carriage 210 is forced against the stop member 310 when the actuator 100 is in use-both when pivoting the propulsor 36 towards the stowed position, and towards the deployed position. In each case, forces are generated on the carriage 210 in the first direction D1.

FIG. 12 shows the device 20 with the propulsor 36 in a deployed position, the actuator 100 having a length L3. As stated above, one end of the actuator 100 must be translatable to pivot the propulsor 36 towards the stowed position without changing the length L3 of the actuator 100. As shown in FIG. 13, pivoting the propulsor 36 via the second actuator 21 causes the carriage 210 to translate in the second direction D2, away from and unconstrained by the stop member 310. Specifically, the propulsor 36 has been pivoted into the stowed position by pivoting the handle 280 about the pin 274 from the closed position of FIG. 12 into the open position of FIG. 13, then rotating the handle 280 about the axis 255 of the rod 250 to translate the block 240 and pull the cable 220 in the pulling force direction P3 in the manner described above. It should be recognized that the length L3 of the actuator 100 is therefore unchanged from FIG. 12 to FIG. 13 while stowing the propulsor 36.

Figure 14:
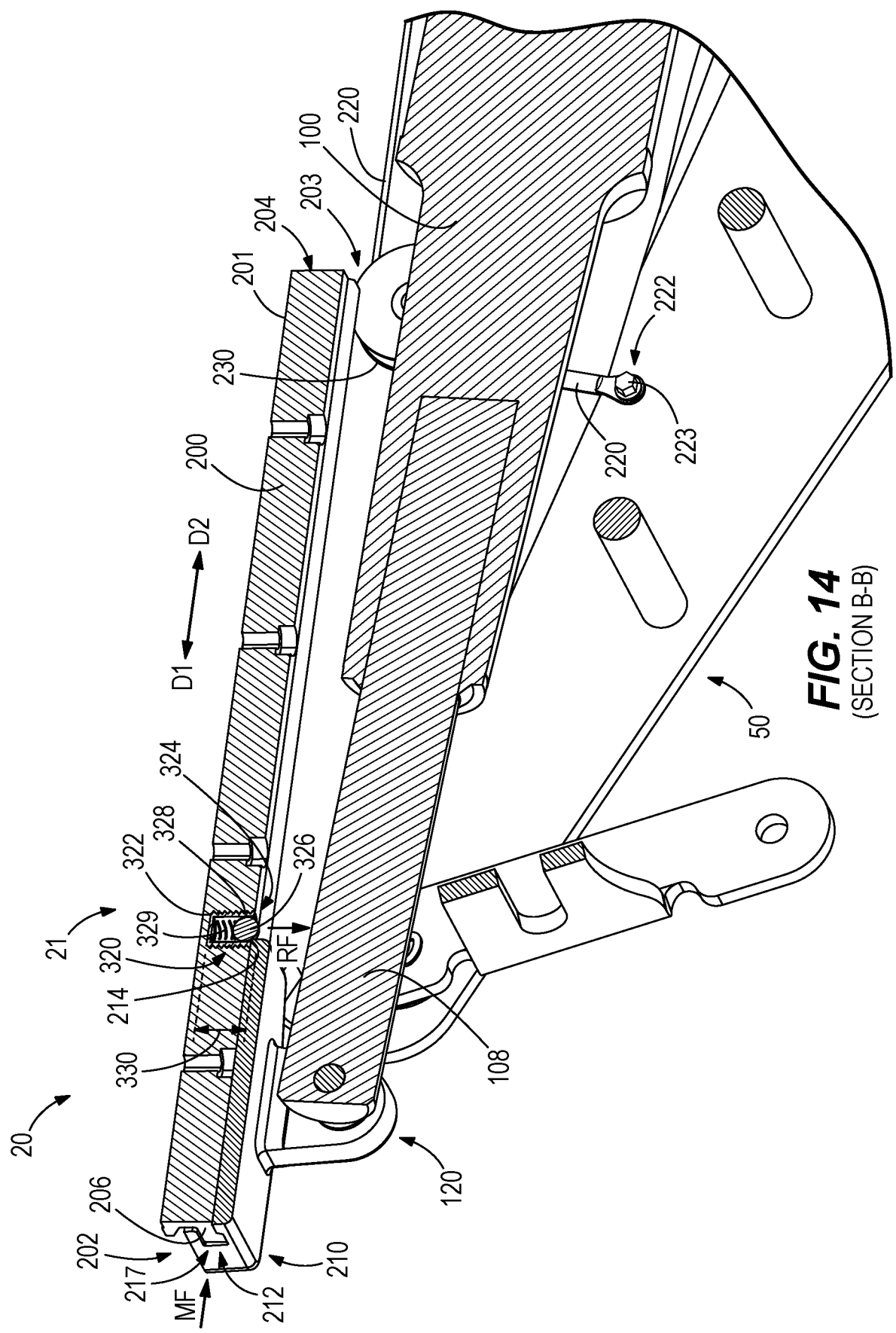
FIG. 14 is a right perspective view showing a sectional view of a rail and carriage for coupling the first actuator taken along the line B-B in FIG. 8.

With reference to FIGS. 13 and 14, the device 20 further includes a detent 320 that constrains the translation of the carriage 210 in the second direction D2. The detent 320 is a spring-biased ball detent as known in the art, which extends from a first end 322 to a second end 324. The first end 322 threadingly engages within the bottom 203 of the rail 200 to fix the detent 320 in position. The second end 324 of the detent 320 is flush or recessed with the bottom 203 of the rail 200 so as to not preclude movement of the carriage 210 past the detent 320 on the rail 200. The detent 320 is open at the second end 324 and includes a receiver 328 for retaining a ball 326 therein. A spring 329 biases the ball 326 away from the first end 322 of the detent 320. In this manner, a distance 330 between the first end 322 and the farthest point on the ball 326 is variable by compression of the spring 329 in a conventional manner.

When the ball 326 of the detent 320 is fully extended, the distance 330 is such that the ball 326 extends downwardly from the bottom 203 of the rail 200. In this state, the detent 320 provide a resistance force RF that resists movement of the carriage 210 in the second direction D2 past the detent 320 unless and until a movement force in the second direction D2 exceeds the resistance force of the detent 320. When the carriage 210 is forced in the second direction D2 with a movement force MF exceeding the resistance force RF provided by the spring 329, the second end 214 of the carriage 210 forces the ball 326 into the receiver 328 towards the first end 322 of the detent 320. This permits the carriage 210 to translate in the second direction D2 past the ball 326 (as shown in FIG. 13).

The present inventors have further recognize that it is advantageous to prevent the carriage 210 from moving in the second direction D2 when the second actuator 21 is not being used to stow the propulsor 36. For example, using the propulsor 36 in the water, as well as actuation of the actuator 100, can result in minor and/or momentary forces that would move the carriage 210 in the second direction D2 if completely unconstrained. This results in a bouncing movement of the carriage 210 repeated contacting the stop member 310, resulting in a harsh feeling and wear and tear on the device 20. In view of this, the detent 320 is configured to provide a resistance force RF that prevents unintended movement of the carriage 210 away from the stop member 310, while nonetheless permitting the carriage 210 to move past the detent 320 when using the second actuator 21 to manually stow the propulsor 36. The present inventors have further recognized that the detent 320 disclosed herein also prevents damage to the device 20 if an obstacle is encountered when attempting to deploy the propulsor 36. For example, if the propulsor 36 is moved towards the deployed position (i.e., by shortening the length L3 of the actuator 100) while the marine vessel is trailered, one or more elements of the device 20 may contact the trailer and be prevented from moving. In this case, the detent 320 may be configured to give way under the force of the actuator 100 such that the carriage 210 moves past the detent 320 in the second direction D2 before damage to the actuator 100 or other elements are damaged.

The devices described herein therefore provide for a second actuator 21 for stowing a propulsor 36 when the first actuator 100 is inoperable, providing a safer and more convenient alternative to devices and methods presently known in the art.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A stowable propulsion device for a marine vessel, the stowable propulsion device comprising:
   a base configured to be coupled to the marine vessel;
   a propulsor configured to propel the marine vessel in water;
   an arm that pivotably couples the propulsor to the base such that the propulsor is movable into and between a stowed position and a deployed position, wherein the propulsor is closer to the base in the stowed position than in the deployed position;
   a first actuator that pivots the arm so as to move the propulsor into and between the stowed position and the deployed position; and
   a second actuator that is manually actuatable and that pivots the arm so as to move the propulsor towards the stowed position.

2. A stowable propulsion device for a marine vessel, the stowable propulsion device comprising:
   a base configured to be coupled to the marine vessel;
   a propulsor configured to propel the marine vessel in water;
   an arm that pivotably couples the propulsor to the base such that the propulsor is movable into and between a stowed position and a deployed position, wherein the propulsor is closer to the base in the stowed position than in the deployed position;
   a first actuator that pivots the arm so as to move the propulsor into and between the stowed position and the deployed position; and
   a second actuator that is manually actuatable to pivot the arm so as to move the propulsor towards the stowed position, wherein the second actuator comprises a cable connected at a first end to the arm, wherein pulling a second end of the cable opposite the first end pivots the arm so as to move the propulsor towards the stowed position.

3. The stowable propulsion device according to claim 2, further comprising a threaded rod rotatably coupled to the base and a block with a threaded opening engaging the threaded rod, wherein the second end of the cable is coupled to the block, and wherein the rotating the threaded rod relative to the block causes the block to translate along the threaded rod so as to pull the cable.

4. The stowable propulsion device according to claim 3, further comprising a sheath that extends parallel to the threaded rod, wherein the block engages with the sheath to prevent rotation of the block during translation along the treaded rod.

5. The stowable propulsion device according to claim 4, further comprising a handle coupled to the threaded rod for rotating the threaded rod to translate the block and pull the cable.

6. The stowable propulsion device according to claim 5, wherein the second end of the rod is closer to the propulsor in the stowed position than in the deployed position.

7. The stowable propulsion device according to claim 2, further comprising a pulley supporting the cable between the first end and the second end such that pulling the second end of the cable in a first direction pulls the arm, via the first end of the cable, in a second direction that is different than the first direction.

8. The stowable propulsion device according to claim 7, further comprising a threaded rod rotatably coupled to the base and a block with a threaded opening engaging the threaded rod, wherein the second end of the cable is coupled to the block, and wherein the rotating the threaded rod relative to the block causes the block to translate along the threaded rod so as to pull the cable.

9. The stowable propulsion device according to claim 8, wherein the threaded rod is positioned so as to extend parallel to the arm when the propulsor is in the stowed position.

10. The stowable propulsion device according to claim 1, wherein the first actuator is a linear actuator coupled to the arm via one or more linkages, and wherein the second actuator is coupled to the one or more linkages, the propulsor being movable toward the stowed position by moving the one or more linkages.

11. A stowable propulsion device for a marine vessel, the stowable propulsion device comprising:
    a base configured to be coupled to the marine vessel;
    a rail coupled to the base and a carriage that moves along the rail in a first direction and in a second direction opposite the first direction;
    a propulsor configured to propel the marine vessel in water;
    an arm that pivotably couples the propulsor to the base such that the propulsor is movable into and between a stowed position and a deployed position, wherein the propulsor is closer to the base in the stowed position than in the deployed position;
    a first actuator coupled at a first end to the carriage and coupled at a second end to the arm, wherein actuating the first actuator creates forces on the carriage in the first direction along the rail and causes the arm to rotate; and
    a stop member positioned to limit the movement of the carriage and thus the first end of the first actuator in the first direction when the propulsor is moved via the first actuator towards the stowed position and towards the deployed position, wherein limiting the movement of the carriage limits movement of the first end of the first actuator such that actuation of the first actuator causes the second end to move to pivot the arm.

12. The stowable propulsion device according to claim 11, wherein the first actuator is positioned such that when the base is coupled to the marine vessel, gravity acting on the propulsor creates forces on the carriage in the first direction, wherein the stop member limits the movement of the carriage and pivoting of the arm caused by gravity.

13. The stowable propulsion device according to claim 11, further comprising a second actuator coupled to the arm and manually actuatable to pivot the arm so as to move the propulsor towards the stowed position.

14. The stowable propulsion device according to claim 13, wherein manually actuating the second actuator causes the carriage to move in the second direction.

15. The stowable propulsion device according to claim 11, wherein the first actuator is a linear actuator.

16. The stowable propulsion device according to claim 11, further comprising a detent configured to provide a resistance force, wherein the detent is configured to prevent the movement of the carriage in the second direction past the detent unless a movement force acting on the carriage in the second direction exceeds the resistance force of the detent.

17. The stowable propulsion device according to claim 16, further comprising a second actuator that is manually actuatable and coupled to the arm, wherein manually actuating the second actuator provides the movement force causing the carriage to move in the second direction.

18. The stowable propulsion device according to claim 17, wherein the second actuator comprises a cable coupled to the arm, wherein pulling the cable pivots the arm and provides the movement force on the carriage through the first actuator coupled to the arm and the carriage.

19. A stowable propulsion device for a marine vessel, the stowable propulsion device comprising:
- a base configured to be coupled to the marine vessel;
- a rail coupled to the base and a carriage that moves along the rail in a first direction and in a second direction opposite the first direction;
- a propulsor configured to propel the marine vessel in water;
- an arm that pivotably couples the propulsor to the base such that the propulsor is movable into and between a stowed position and a deployed position, wherein the propulsor is closer to the base in the stowed position than in the deployed position;
- a first actuator coupled at a first end to the carriage and coupled at a second end to the arm, wherein actuating the first actuator creates forces on the carriage in the first direction along the rail and causes the arm to pivot so as to move the propulsor into and between the stowed position and the deployed position;
- a second actuator coupled to the arm and manually actuatable to pivot the arm so as to move the propulsor towards the stowed position;
- a stop member positioned to limit the movement of the carriage in the first direction, wherein limiting the movement of the carriage limits movement of the first end of the first actuator such that actuation of the first actuator causes the second end to move to pivot the arm; and
- a detent configured to provide a resistance force, wherein the detent prevents the movement of the carriage in the second direction past the detent unless a movement force acting on the carriage in the second direction exceeds the resistance force of the detent, and wherein manually actuating the second actuator provides the movement force on the carriage to move past the detent in the second direction so as to pivot the arm and move the propulsor towards the stowed position.

* * * * *